United States Patent
Maegawa et al.

(10) Patent No.: US 7,468,953 B2
(45) Date of Patent: Dec. 23, 2008

(54) PATH SETTING METHOD FOR NETWORK STATIONS

(75) Inventors: Koji Maegawa, Otsu (JP); Hideki Sakai, Osaka (JP); Shinji Yamamoto, Hirakata (JP)

(73) Assignees: The Kansai Electric Power Co., Inc., Osaka (JP); Panasonic Electric Works Co., Ltd., Osaka (JP)

( * ) Notice: Subject to any disclaimer, the term of this patent is extended or adjusted under 35 U.S.C. 154(b) by 692 days.

(21) Appl. No.: 10/523,525

(22) PCT Filed: Sep. 22, 2004

(86) PCT No.: PCT/JP2004/014304

§ 371 (c)(1),
(2), (4) Date: Feb. 4, 2005

(87) PCT Pub. No.: WO2005/032077

PCT Pub. Date: Apr. 7, 2005

(65) Prior Publication Data

US 2006/0077906 A1    Apr. 13, 2006

(30) Foreign Application Priority Data

Sep. 29, 2003    (JP)    ............... 2003-338696

(51) Int. Cl.
H04L 12/28    (2006.01)
(52) U.S. Cl. .................... 370/254; 370/351
(58) Field of Classification Search ........ 370/248, 370/254, 255, 332, 351
See application file for complete search history.

(56) References Cited

U.S. PATENT DOCUMENTS 6,396,814 B1 * 5/2002 Iwamura et al. ............. 370/256

(Continued)

FOREIGN PATENT DOCUMENTS

JP    2002-204247    7/2002

(Continued)

OTHER PUBLICATIONS

English Language Abstract of JP 2003-282255.

(Continued)

*Primary Examiner*—Huy D Vu
*Assistant Examiner*—Asif H Khan
(74) *Attorney, Agent, or Firm*—Greenblum & Bernstein, P.L.C.

(57) ABSTRACT

The present invention provides a path setting method for automatically setting network paths. The path setting method for generating paths in a network including a plurality of relay stations and a parent station which are connected with each other through a transmission line, comprises the steps of allowing each of the parent station and the plurality of relay stations to transmit basic information including its own identifier and its own path setting status, by means of a repetitive broadcast, allowing the relay station receiving the basic information to recognize the parent station or another relay station having a temporary path set thereto and transmit its own receiving-environment table including a transmission quality on the transmission line to the recognized station, allowing the another relay station receiving the receiving-environment table to forward it to the parent station through the use of the temporary path so as to notify the receiving-environment table to the parent station, and allowing the parent station receiving the forwarded receiving-environment table to set a temporary path to the relay station which has transmitted the receiving-environment table. In this manner, the parent station collects the transmission qualities on the inter-station transmission lines stepwise in order of the closest relay station to the farthest relay station to automatically set the paths.

9 Claims, 16 Drawing Sheets

U.S. PATENT DOCUMENTS

| | | | |
|---|---|---|---|
| 7,106,177 B2 * | 9/2006 | Logvinov et al. | 370/203 |
| 2004/0156353 A1 * | 8/2004 | Bevan et al. | 370/351 |
| 2004/0215822 A1 | 10/2004 | Abe et al. | |

FOREIGN PATENT DOCUMENTS

| | | |
|---|---|---|
| JP | 2003-78530 | 3/2003 |
| JP | 2003-318985 | 11/2003 |
| JP | 2004-282255 | 10/2004 |

OTHER PUBLICATIONS

English Language Abstract of JP 2003-318985.
English Language Abstract of JP 2002-204247.

* cited by examiner

RECEIVING-ENVIRONMENT TABLE
OF RELAY STATION A AT TIME T₁

| DEVICE TYPE | MAC ADDRESS | PATH-SETTING STATUS | NETWORK ID | PLR VALUE |
|---|---|---|---|---|
| BST | addBST | BST | NWa | 9 |
| RPT | addRPTb | VAC | NWa | 5 |
| RPT | addRPTc | VAC | NWa | 9 |

RECEIVING-ENVIRONMENT TABLE
OF RELAY STATION C AT TIME T1

| DEVICE TYPE | MAC ADDRESS | PATH-SETTING STATUS | NETWORK ID | PLR VALUE |
|---|---|---|---|---|
| RPT | addRPTa | VAC | NWa | 9 |
| RPT | addRPTb | VAC | NWa | 6 |
| RPT | addRPTd | VAC | NWa | 6 |
| RPT | addRPTe | VAC | NWa | 7 |
| RPT | addRPTf | VAC | NWa | 7 |

FIG. 12

RECEIVING-ENVIRONMENT TABLE
OF RELAY STATION C AT TIME T2

| DEVICE TYPE | MAC ADDRESS | PATH-SETTING STATUS | NETWORK ID | PLR VALUE |
|---|---|---|---|---|
| RPT | addRPTa | TEMP | NWa | 9 |
| RPT | addRPTb | TEMP | NWa | 6 |
| RPT | addRPTd | VAC | NWa | 6 |
| RPT | addRPTe | VAC | NWa | 7 |
| RPT | addRPTf | VAC | NWa | 7 |

TRANSMISSION-QUALITY TABLE
(TRANSMITTING SIDE)

| (RECEIVING SIDE) | BST | RPTa | RPTb | RPTc | RPTd | RPTe | RPTf |
|---|---|---|---|---|---|---|---|
| BST |  | 9 | 7 | — | — | — | — |
| RPTa | 9 |  | 5 | 9 | — | — | — |
| RPTb | 7 | 5 |  | 6 | 9 | 6 | — |
| RPTc | — | 9 | 6 |  | 6 | 7 | 7 |
| RPTd | — | — | 9 | 6 |  | 9 | — |
| RPTe | — | — | 6 | 7 | 9 |  | 9 |
| RPTf | — | — | — | 7 | — | 9 |  |

NETWORK CONFIGURATION AFTER TEMPORARY-PATH SETTING

NETWORK CONFIGURATION AFTER FIXED-PATH SETTING

US 7,468,953 B2

PATH SETTING METHOD FOR NETWORK STATIONS

TECHNICAL FIELD

The present invention relates to a path setting method for automatically setting a path (communication path) from a parent station to a relay station or a child station in a network. The present invention also relates to a network, relay station and parent station employing the path setting method.

BACKGROUND ART

In order to transmit and receive communication signals between the respective nodes of a base or parent station, a relay station and a child station in a network, it is necessary to set a path according to the type of network, the transmission quality on a transmission line interconnecting the nodes, and other factors.

Late years, in connection with the progress of communication technologies, developments in networking have been made in various technical fields, and various devices in a house or building are increasingly being connected to networks. The device networking is intended to operate these devices in an organically linked manner and interconnect the network in the building to other networks outside the building in such a manner as to allow the operation of these devices to be instructed from external communication terminals, so as to cope with energy saving, remote control or the like and provide a safe and comfortable living condition. These devices mutually transmit and receive communication signals via networks. As one of communication-signal transmission techniques, there has been known a power-line communication using as a transmission line a distribution line for supplying electric power to these devices (power line). This power-line communication can utilize existing distribution lines to advantageously eliminate the need for laying a new transmission line. Therefore, the power-line communication has additional advantages that an initial installation cost is reduced accordingly, and the deterioration in appearance of a building is avoided.

In a flexible and logical network free from physical factors (VLAN: Virtual Local Area Network), a technique for adding a new user terminal thereto is described in Japanese Patent Laid-Open Publication No. 2002-204247. This publication describes a VLAN information registration system in a VLAN-based network, which comprises: means for allowing a given user-information item required for connecting to the network to be entered at the initiative of a user and then automatically generating user-information management data. The VLAN information registration system further comprises means for converting user registration information to VLAN information, the user registration information being automatically generated by the user-information management data automatic generation means. The VLAN information registration system further comprises means for automatically generating a correspondence table between the VLAN information converted by the conversion means and a MAC (Media Access Control) address of a user terminal. The VLAN information registration system further comprises means for allowing the correspondence table generated by the corresponding-table automatic generation means to be updated in a URT (User Registration Tool) and means for retrieving registered user information and displaying necessary information on an administrator screen. This automatic VLAN information registration system allows a new user terminal to be automatically connected to a network without the need for a network administrator to set VLAN information.

In the power-line communication, the distribution lines are originally intended for power supply, and thereby the transmission quality in each of actual distribution lines varies depending on laying circumstances. This causes difficulties in designing a network in a desktop manner, because the layout position of a relay station cannot be pre-specified in developing the network. Thus, a network has heretofore been developed by measuring the transmission quality on a distribution line at an actual construction site, and locating a relay station thereat if required. Then, in an operation of setting a path to each node in the power-line communication network, the path has been manually set to the node of each station after its construction. Due to these situations, the power-line communication has been required to take a great deal of manual effort and time for the network development and the path setting operation.

Moreover, in the power-line communication, the transmission quality can be dynamically changed due to the variation in load connected with a distribution line. Thus, even if a path is adequately set up, an excellent communication cannot be always maintained.

The technique described in the aforementioned publication is for use in a higher layer than a data link layer, wherein a user who intends to connect to a network is required to enter user information from a new user terminal.

In view of the above problems, it is therefore an object of the present invention to provide a path setting method allowing a path to be automatically set up. It is another object of the present invention to provide a network, relay station and parent station employing this path setting method.

DISCLOSURE OF INVENTION

In order to achieve the above object, according to one aspect of the present invention, there is provided a path setting method for generating paths from a parent station to respective ones of a plurality of relay stations in a network, wherein the relay stations and the parent station are connected with each other through a transmission line. The path setting method comprises the steps of: allowing each of the parent station and the plurality of relay stations to transmit a basic-information notification signal containing basic information which includes an identifier identifying its own station and the status of the path setting to its own station, to the network at a first time interval by means of a repetitive broadcast; allowing, in response to receiving the basic-information notification signal, each of the parent station and the plurality of relay stations to detect a receiving state and calculate a transmission quality on a transmission line interconnecting with the station which has transmitted the basic-information notification signal, in accordance with the receiving state; allowing each of the parent station and the plurality of relay stations to create or update a receiving-environment table correlating the basic information contained in the basic-information notification signal to the transmission quality on the transmission line interconnecting with the station which has transmitted the basic-information notification signal, and store the created or updated receiving-environment table therein; allowing each of the plurality of relay stations to repeatedly refer to the path-setting status in the receiving-environment table at a second time interval greater than the first time interval, and, when the reference result shows that temporary-path setup information representing the completion of setting a temporary path exists in the path-setting status, transmit a receivingenvironment-table communication signal containing the receiving-environment table of its own station through the transmission line used for transmitting the basic-information notification signal containing the temporary-path setup information; allowing, in response to receiving the receiving-environment-table communication signal, each of the plurality of relay stations to forward the received receiving-environment-table communication signal to the parent station through the use of the temporary path; allowing, in response to receiving the receiving-environment-table communication signal, the parent station to create or update a transmission-quality table correlating the inter-station transmission line to the transmission quality thereof, in accordance with the identifier and the transmission quality contained in the receiving-environment-table communication signal, and store the created or updated transmission-quality table therein; allowing, in response to receiving the receiving-environment-table communication signal, the parent station to set a temporary path to the relay station which has transmitted the receiving-environment-table communication signal, and return a temporary-path setup information containing the temporary path to the relay station; and allowing, in response to a lapse of a third time period greater than the second time interval, the parent station to set the paths to respective ones of the plurality of relay stations, in accordance with the transmission qualities in the transmission-quality table, and transmit the set paths to respective ones of the plurality of relay stations.

According to another aspect of the present invention, there may be provided a network including a plurality of relay stations and a parent station which are connected with each other through a transmission line, and configured to generate paths from the parent station to respective ones of the relay stations. In this network, each of the relay stations comprises: a first communication section operable to transmit and receive a communication signal to/from the network, and detect a receiving state of the communication signal; a first processing section operable to transmit a basic-information notification signal containing basic information which includes an identifier identifying its own station and the status of the path setting to its own station to the network using the first communication section at a first time interval by means of a repetitive broadcast; a second processing section operable to calculate a transmission quality on an interconnecting line with the station which has transmitted the basic-information notification signal, in accordance with the receiving state; a third processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof; a fourth processing section operable to repeatedly refer to the path-setting status in the receiving-environment table at a second time interval greater than the first time interval, and, when the reference result shows that temporary-path setup information representing the completion of setting a temporary path exists in the path-setting status, transmit a receiving-environment-table communication signal containing the receiving-environment table of its own station through the transmission line used for transmitting the basic-information notification signal containing the temporary-path setup information; and a fifth processing section operable, in response to receiving the receiving-environment-table communication signal, to forward the received receiving-environment-table communication signal to the parent station through use of the temporary path. Further, the parent station comprises: a second communication section operable to transmit and receive a communication signal to/from the network, and detect a receiving state of the communication signal; a sixth processing section operable to transmit a basic-information notification signal containing basic information which includes an identifier identifying its own station and the status of the path setting to its own station, to the network using the second communication section at the first time interval by means of a repetitive broadcast; a seventh processing section operable to calculate a transmission quality on a transmission line interconnecting with the station which has transmitted the basic-information notification signal, in accordance with the receiving state; an eighth processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof; a ninth processing section operable, in response to receiving the receiving-environment-table communication signal, to create or update a transmission-quality table correlating the inter-station transmission line to the transmission quality thereof, in accordance with the identifier and the transmission quality contained in the receiving-environment-table communication signal, and store the created or updated transmission-quality table in a transmission-quality-table storage section thereof; a tenth processing section operable, in response to receiving the receiving-environment-table communication signal, to set a temporary path to the relay station which has transmitted the receiving-environment-table communication signal, and return a temporary-path notification communication signal containing the temporary path to the relay station using the second communication section; and an eleventh processing section operable, in response to a lapse of a third time period greater than the second time interval, to set the paths to respective ones of the plurality of relay stations, in accordance with the transmission qualities in the transmission-quality table, and transmit the set paths to respective ones of the plurality of relay stations using the second communication section.

According to still another aspect of the present invention, there may be provided a relay station applicable to a network including a plurality of relay stations and a parent station which are connected with each other through a transmission line, and configured to generate paths from the parent station to respective ones of the relay stations. The relay station comprises: a first communication section operable to transmit and receive a communication signal to/from the network, and detect a receiving state of the communication signal; a first processing section operable to transmit a basic-information notification signal containing basic information which includes an identifier identifying its own station and the status of the path setting to its own station, to the network using the first communication section at a first time interval by means of a repetitive broadcast; a second processing section operable to calculate a transmission quality on a transmission line interconnecting with the station which has transmitted the basic-information notification signal, in accordance with the receiving state; a third processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof; a fourth processing section operable to repeatedly refer to the path-setting status in the receiving-environment table at a second time interval greater than the first time interval, and, when the reference result shows that temporary-path setup information representing the completion of setting a temporary path exists in the path-setting status, transmit a receiving-environment-table communication signal containing the receiving-environment table of its own station through the transmission line used for transmitting the basic-information notification signal containing the temporary-path setup information; and a fifth processing section operable, in response to receiving the receiving-environment-table communication signal, to forward the received receiving-environment-table communication signal to the parent station through use of the temporary path.

According to yet another aspect of the present invention, there may be provided a parent station applicable to a network including a plurality of relay stations and a parent station which are connected with each other through a transmission line, and configured to generate paths from the parent station to respective ones of the relay stations. The parent station comprises: a second communication section operable to transmit and receive a communication signal to/from the network, and detect a receiving state of the communication signal; a sixth processing section operable to transmit a basic-information notification signal containing basic information which includes an identifier identifying its own station and the status of the path setting to its own station, to the network using the second communication section at the first time interval by means of a repetitive broadcast; a seventh processing section operable to calculate a transmission quality on a transmission line interconnecting with the station which has transmitted the basic-information notification signal, in accordance with the receiving state; an eighth processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof; a ninth processing section operable, in response to receiving the receiving-environment-table communication signal, to create or update a transmission-quality table correlating the inter-station transmission line to the transmission quality thereof, in accordance with the identifier and the transmission quality contained in the receiving-environment-table communication signal, and store the created or updated transmission-quality table in a transmission-quality-table storage section thereof; a tenth processing section operable, in response to receiving the receiving-environment-table communication signal, to set a temporary path to the relay station which has transmitted the receiving-environment-table communication signal, and return a temporary-path notification communication signal containing the temporary path to the relay station using the second communication section; and an eleventh processing section operable, in response to a lapse of a third time period greater than the second time interval, to set the paths to respective ones of the plurality of relay stations, in accordance with the transmission qualities in the transmission-quality table, and transmit the set paths to respective ones of the plurality of relay stations using the second communication section.

In cases where an additional relay station is newly added to the network, the above path setting method may further include the steps of: allowing the additional relay station to transmit the basic-information notification signal to the network by means of a broadcast; allowing, in response to receiving the basic-information notification signal from the additional relay station, the existing relay station to return the basic-information notification signal containing the basic information of its own station to the additional relay station; allowing, in response to receiving the basic-information notification signal returned from the existing relay station, the additional relay station to detect a receiving state and calculate a transmission quality on a transmission line interconnecting with the existing relay station which has returned the basic-information notification signal, in accordance with the receiving state; allowing the additional relay station to create or update a receiving-environment table correlating the basic information contained in the basic-information notification signal returned from the existing relay station to the transmission quality on the transmission line interconnecting with the existing relay station which has returned the basic-information notification signal, and store the created or updated receiving-environment table therein; allowing the additional relay station to refer to the transmission quality in the receiving-environment table, and transmit a receiving-environment-table communication signal containing the receiving-environment table of its own station to the parent station through the transmission line having the best transmission quality determined by the reference result; allowing, in response to receiving the receiving-environment-table communication signal from the additional relay station, the parent station to update the transmission-quality table in accordance with the identifier and the path-setting status contained in the receiving-environment-table communication signal, and store the updated transmission-quality table therein; and allowing the parent station to set the paths to respective ones of the plurality of relay stations including the additional relay station, in accordance with the transmission qualities in the transmission-quality table, and transmit the set paths to respective ones of the plurality of relay stations including the additional relay station.

In a case where a child station is newly added to the network, the above path setting method may further include: allowing the child station to transmit the basic-information notification signal to the network by means of a broadcast. The path setting method further includes allowing, in response to receiving the basic-information notification signal from the child station, the relay station to return the basic-information notification signal containing the basic information of its own station to the child station. The path setting method further includes allowing, in response to receiving the basic-information notification signal returned from the relay station, the child station to detect a receiving state and calculate a transmission quality on a transmission line interconnecting with the relay station which has returned the basic-information notification signal, in accordance with the receiving state. The path setting method further includes allowing the child station to create or update a receiving-environment table correlating the basic information contained in the basic-information notification signal returned from the relay station to the transmission quality on the transmission line interconnecting with the relay station which has returned the basic-information notification signal, and store the created or updated receiving-environment table therein. The path setting method further includes allowing the child station to refer to the transmission quality in the receiving-environment table, and transmit a receiving-environment-table communication signal containing the receiving-environment table of its own station to the parent station through the transmission line having the best transmission quality determined by the reference result. The path setting method further includes allowing, in response to receiving the receiving-environment-table communication signal from the child station, the parent station to set a path to the child station in accordance with the path used for transmitting the receiving-environment-table communication signal, and transmit the set path to the child station.

The above path setting method may further include the steps of: allowing each of the parent station and the plurality of relay stations when receiving a communication signal from another station, to detect a receiving state and calculate a transmission quality on a transmission line interconnecting with the another station, in accordance with the receiving state; allowing the parent station to collect the transmission qualities from the plurality of relay stations; allowing the parent station to re-set the paths to respective ones of the plurality of relay stations, in accordance with the collected transmission qualities; allowing the parent station to comparing the paths to respective ones of the plurality of relay stations before the re-setting with the re-set paths to respective ones of the plurality of relay stations; and allowing the parent station to present the comparison result.

In the above path setting method, the transmission line may be either one of a wireless line, and a distribution line for supplying electric power. In the above path setting method, the transmission quality on the transmission line may be a PLR value calculated from the receiving state of the transmission line, a packet length of the communication signal, and a communication rate of the transmission line.

In the path setting method, the network, the relay station and the parent station according to the present invention, each of the parent station and the plurality of relay stations transmits the basic-information notification signal containing the basic information by means of a broadcast, and each of the relay stations receives the basic-information notification signals from other stations, so that each of the relay stations recognizes the parent station or the relay station having a temporary path set thereto. Then, each of the relay stations transmits the receiving-environment-table communication signal to the recognized parent station or the recognized relay station having the temporary path. When the recognized relay station receives the receiving-environment-table communication signal, it forwards the receiving-environment-table communication signal to the parent station through the use of the temporary path. In this manner, the receiving-environment table of each of the relay stations is notified to the parent station. Then, the parent station sets a temporary path to the relay station which has transmitted the receiving-environment-table communication signal. Thus, according to the path setting method of the present invention, the parent station can set a temporary path stepwise to each of the relay stations in order of the closest relay station to the farthest relay station in terms of network topology. With the use of this temporary path, the parent station can collect from each of the relay stations the transmission qualities on inter-station transmission lines required for setting paths, so as to allow the parent station to automatically set the paths.

BRIEF DESCRIPTION OF DRAWINGS

FIG. 12 is a diagram showing a receiving-environment table of the relay station c at Time $T_2$.

BEST MODE FOR CARRYING OUT THE INVENTION

Figure 1:
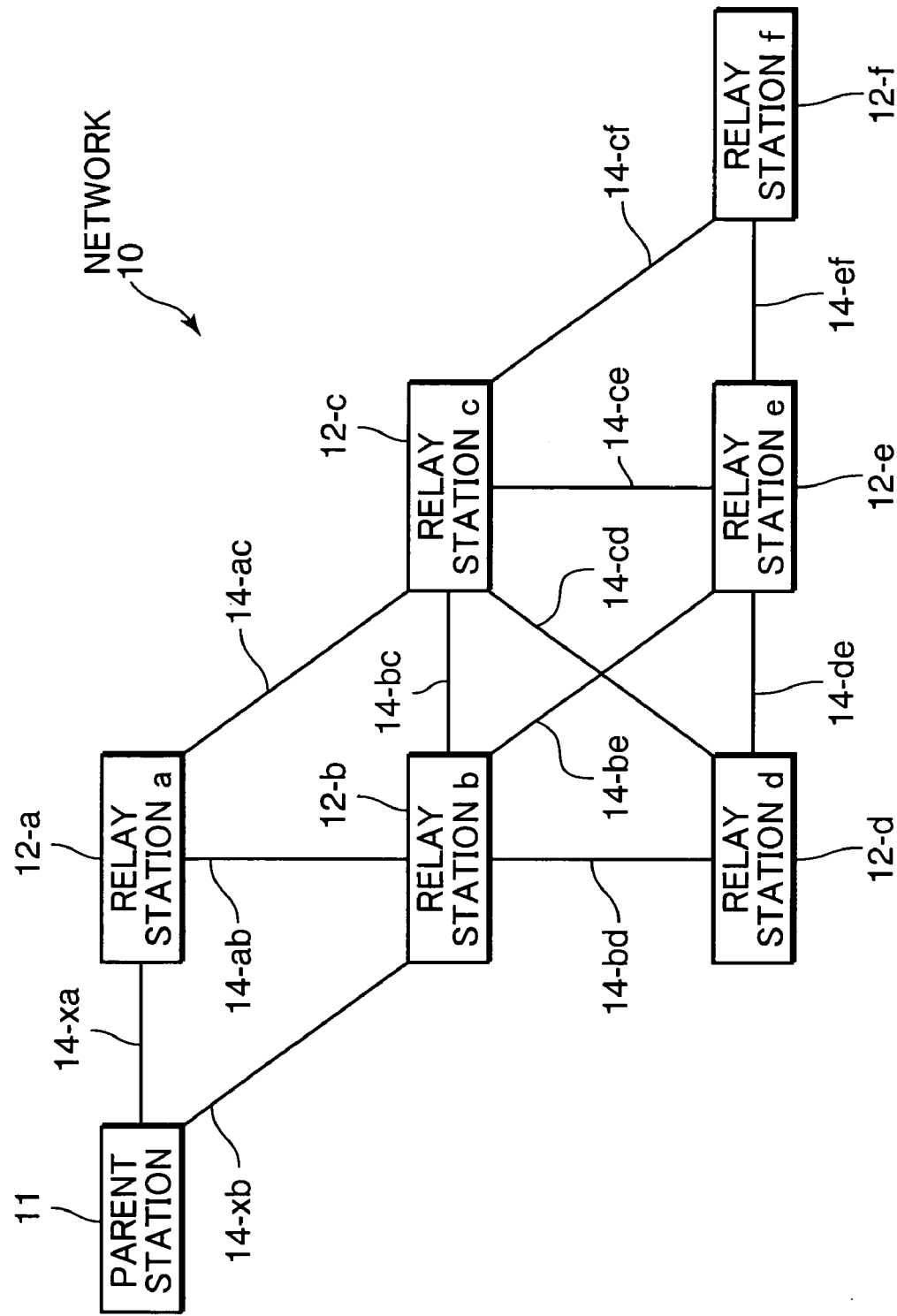
FIG. 1 is a block diagram showing the configuration of a network according to one embodiment of the present invention.

With reference to the drawings, an embodiment of the present invention will now be described. In the figures, components or elements defined by a common reference numeral are equivalent to each other, and duplicate descriptions will be omitted.

Configuration of Embodiment

While the present invention is applicable to a network having any topology (mesh configuration), the following description will be made in connection with one example where the present invention is applied to a network 10 having a specific topology as show in FIG. 1.

Figure 2:
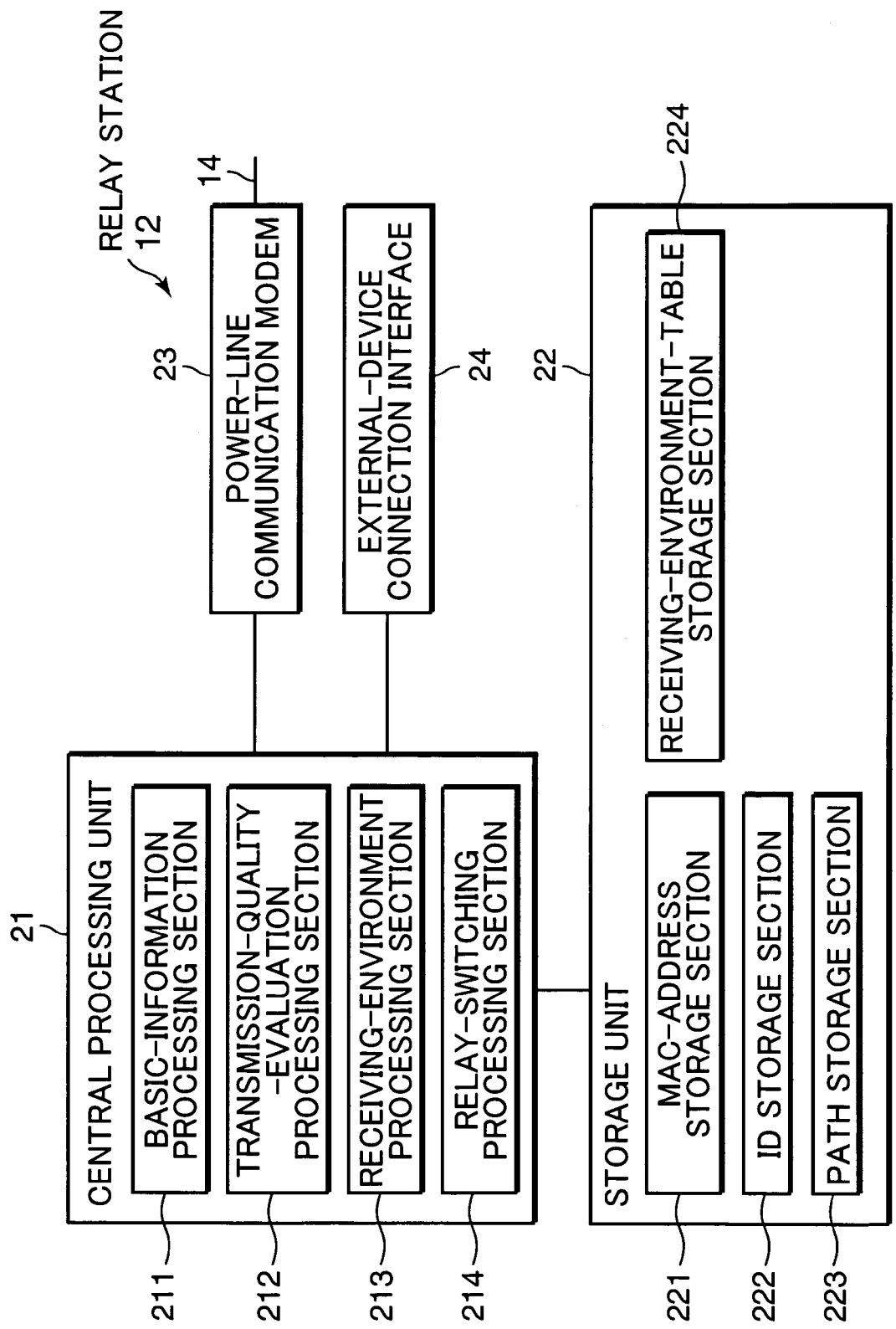
FIG. 2 is a block diagram showing the configuration of a relay station.
Figure 3:
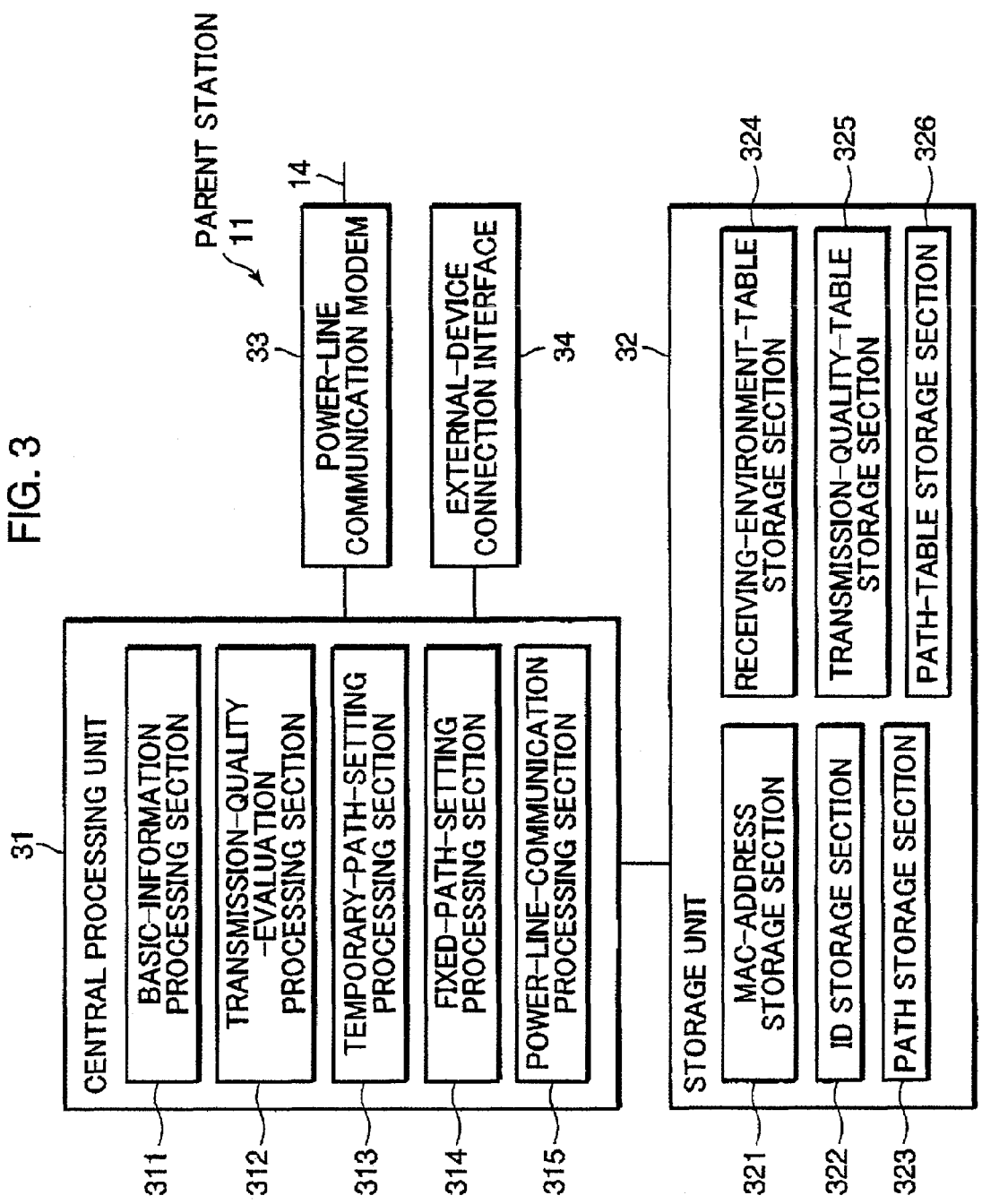
FIG. 3 is a block diagram showing the configuration a parent station.
Figure 4:
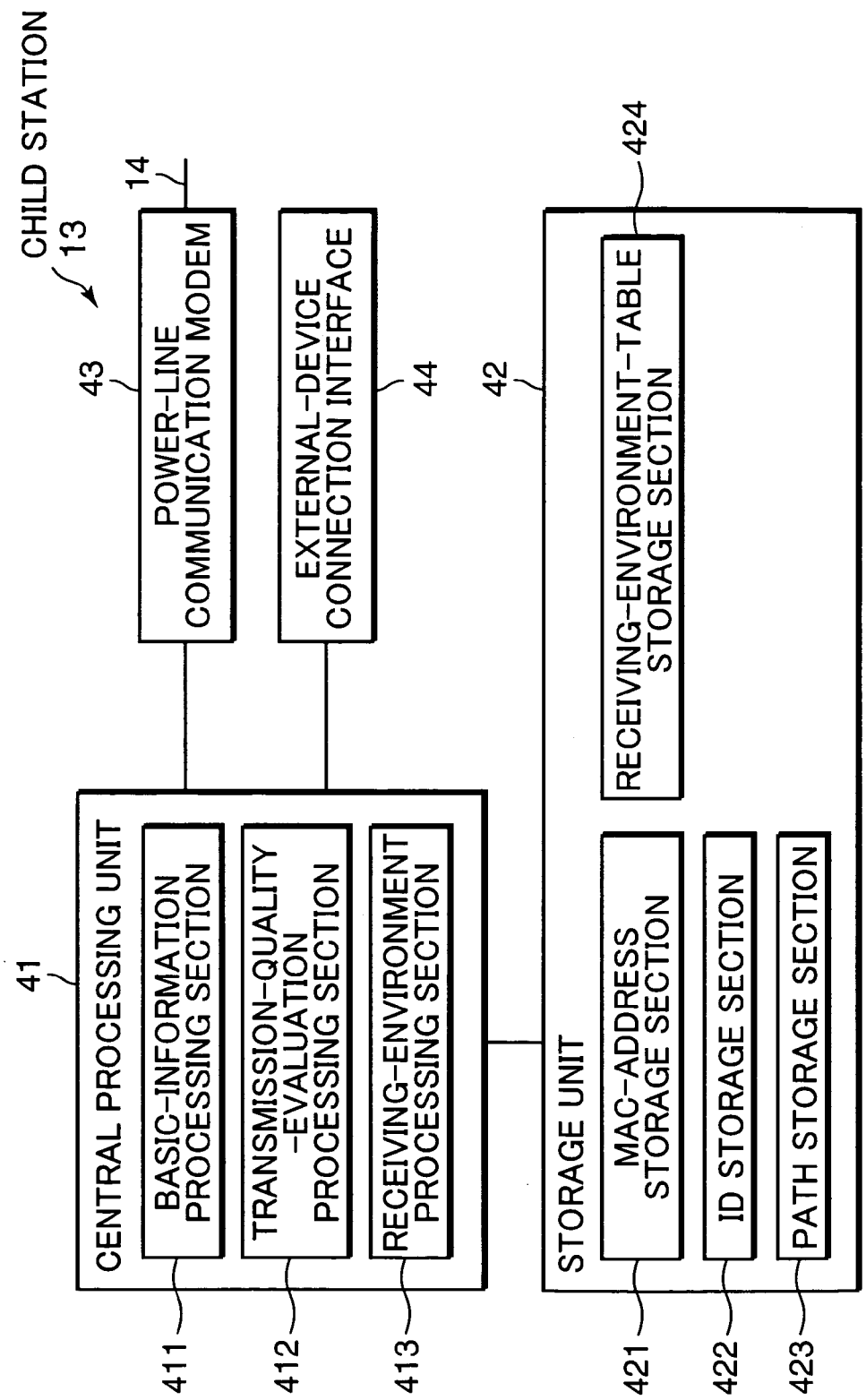
FIG. 4 is a block diagram showing the configuration a child station.

FIG. 1 is a block diagram showing the configuration of the network according to an embodiment of the present application. FIG. 2 is a block diagram showing the configuration of a relay station. FIG. 3 is a block diagram showing the configuration of a parent station. FIG. 4 is a block diagram showing the configuration of a child station.

In FIG. 1, the network 10 according to this embodiment comprises a parent station 11, a plurality of relay stations 12 (12-a to 12-f), one or more child stations 13 (not shown) connected to each of the relay stations 12, and a transmission line 14 (14-xa to 14-ef) interconnecting between the parent station, the relay stations 12 and the child stations 13.

While the transmission line 14 may be either one of a wire line and a wireless line, this embodiment is configured to transmit and receive a communication signal between the parent station 11 and each of the child station 13 through the relay stations 12 according to need based on a power-line communication system, and thereby the transmission line 14 is a distribution line (power line) for supplying electric power to devices. Each of the parent station 11, the relay stations 12 and the child stations is connected to the transmission line 14 through a plug or the like associated with the distribution line.

Alternatively, each of the parent station 11, the relay stations 12 and the child stations may be connected directly to the transmission line 14

The parent station 11, the relay stations 12 and the transmission line 14 serve as main lines of the network 10, wherein the parent station 11 and the relay station a 12-*a* are interconnected by the transmission line 14-*xa*, the parent station 11 and the relay station b 12-*b* being interconnected by the transmission line 14-*xb*, the relay station a 12-*a* and the relay station b 12-*b* are interconnected by the transmission line 14-*ab*, the relay station a 12-*a* and the relay station c 12-*c* being interconnected by the transmission line 14-*ac*, the relay station b 12-*b* and the relay station c 12-*c* being interconnected by the transmission line 14-*bc*, the relay station b 12-*b* and the relay station d 12-*d* being interconnected by the transmission line 14-*bd*, the relay station b 12-*b* and the relay station e 12-*e* being interconnected by the transmission line 14-*be*, the relay station c 12-*c* and the relay station d 12-*d* being interconnected by the transmission line 14-*cd*, the relay station c 12-*c* and the relay station e 12-*e* being interconnected by the transmission line 14-*ce*, the relay station c 12-*c* and the relay station f 12-*f* being interconnected by the transmission line 14-*cf*, the relay station d 12-*d* and the relay station e 12-*e* being interconnected by the transmission line 14-*de*, and the relay station e 12-*e* and the relay station f 12-*f* being interconnected by the transmission line 14-*ef*.

Firstly, the configuration of each of the relay stations 12 will be described. The relay station 12 is a device for regenerating, amplifying and relaying a communication signal from each of the parent station 11 and the child station. For example, as shown in FIG. 2, the relay station 12 comprises a central processing unit 21, a storage unit 22, a power-line communication modem 23, and an external-device connection interface 24.

The power-line communication modem 23 is operable to convert an output from the central processing unit 21 to a signal with a waveform conforming to the power-line communication, and, after amplifying the converted signal to have a given signal intensity, transmit the amplified signal under a medium access control based on a CSMA/CA (Carrier Sense Multiple Access with Collision Avoidance) protocol. Further, in addition to converting a communication signal received from the transmission line 14 to a signal with a waveform processable by the central processing unit 21, the power-line communication modem 23 is operable to detect a receiving state of a communication signal from the transmission line 14, and output the detection result to the central processing unit 21. For example, the receiving state includes a receiving intensity, a SN Ratio (Signal to Noise Ratio) and an error rate. While the power-line communication modem 23 may be configured to detect one or more of these parameters and output the detection result to the central processing unit 21, this embodiment employs the receiving intensity (power) as the receiving state in view of achieving the present invention in a simplified configuration.

The storage unit 22 comprises: a MAC-address storage section 221 for storing a MAC address for use as an identifier (address) identifying a communication partner in data-link-layer communication; an ID storage section 222 for storing a network ID for use as an identifier (ID) identifying an assigned network; a path storage section 223 for storing a path from its own station to the parent station 11, and a flag (path discrimination flag) indicative of whether the path is stored therein and whether the path is a fixed-path or a temporary path when stored; and a receiving-environment-table storage section 224 for storing a receiving-environment table correlating attribution information (basic information) about a node capable of receiving a communication signal to a transmission quality on the transmission line 14 which has transmitted this communication signal. The storage unit 22 is operable to store various programs, such as a control program, data required for executing the programs, and data generated during the execution of the programs. For example, the storage unit 22 is composed of a RAM (Random Access Memory) which is a volatile memory element, or an EEPROM (Electrically Erasable Programmable Read Only Memory) which is a rewritable nonvolatile memory element.

As for the MAC address herein, a MAC address in so-called Ethernet® may be diverted thereto, or a newly configured MAC address may be used for the path setting method of the present invention.

The fixed-path is used for communications after establishment of the network configuration. In contrast, the temporary path is used for communications during development of the network configuration, and primarily utilized for the purpose of collecting information required for setting the fixed-path from the parent station 11 to the relay station 12.

For example, the path discrimination flag is composed of 2 bits, and configured to indicate "00" when no path is stored, "10" when the stored path is a fixed-path, and "01" when the stored path is a temporary path. While the path-setting status stored in the path storage section 223 in this embodiment is indicated by the path discrimination flag, text information (e.g. "no path", "temporary path" or "fixed-path") indicative of the setting statuses may be stored to indicate the path-setting status.

While this embodiment employs a PLR (packet loss rate) value as an index of the transmission quality, any other suitable index, such as a receiving intensity itself of a received signal, may be used. The PLR value is calculated by the following formula 1 based on a receiving intensity P and a packet length L of the received signal, and a communication rate R of the transmission line:

$$PLR = \alpha \times P + \beta \times L \times R \times Ps \qquad (1)$$

wherein each of $\alpha$ and $\beta$ is a constant number, and Ps is the ratio of packets from which data could be normally extracted, to a total quantity of received packets.

The central processing unit 21 comprises a basic-information processing section 211, a transmission-quality-evaluation processing section 212, a receiving-environment processing section 213 and a relay-switching processing section 214. The central processing unit 21 is operated according to a control program as described later. For example, the central processing unit 21 is composed of a microprocessor.

The basic-information processing section 211 is operable to generate the basic information based on the respective stored contents of the MAC-address storage section 221, the ID storage section 222 and the path storage section 223, and transmit the generated basic information to the transmission line 14 through the power-line communication modem 23. The basic-information processing section 211 is also operable to rewrite the respective stored contents of the ID storage section 222 and the path storage section 223 according to need.

The transmission-quality-evaluation processing section 212 is operable to calculate a transmission quality based on an output of the power-line communication modem 23. The receiving-environment processing section 213 is operable to create or update the receiving-environment table based on the basic information received from the parent station 11 or another relay station 12 and the transmission quality calculated by the transmission-quality-evaluation processing section 212, and store the created or updated receiving-environment table in the receiving-environment-table storage section 224. The receiving-environment processing section 213 is also operable to transmit the receiving-environment table to the transmission line 14 through the power-line communication modem 23.

The relay-switching processing section 214 is operable, in response to setting a fixed-path to the relay station, to switch the processing of the power-line communication modem 23 such that a communication signal received by the power-line communication modem 23 is amplified at a given amplification factor without being converted to a signal with a waveform processable by the central processing unit 21, and then the amplified signal is transmitted to the transmission line 14, so as to fulfill intended functions as a relay station. The relay station 12 may be configured to perform reproduction and relay.

The external-device connection interface 24 serves as an interface between the relay station 12 and various setting devices for allowing a network ID to be stored in the ID storage section 222 so as to set the network ID to the relay station 12 and for reading and/or writing internal data of the relay station 12. As to setting the network ID to the relay station 12, in place of the external-device connection interface 24, a selector switch, such as a DIP switch or a rotary switch, capable of selecting either one of a plurality of outputs, may be provided to set the network ID.

Secondly, the configuration of the parent station will be described. The parent station 11 is a device for performing the setting of paths, the management of transmission rights, and, if needed, a communication control to the power-line communication network 10, such as the transmission of superframe cycles. For example, as shown in FIG. 3, the parent station 11 comprises a central processing unit 31, a storage unit 32, a power-line communication modem 33, and an external-device connection interface 34. The power-line communication modem 33 and the external-device connection interface 34 are equivalent, respectively, to the power-line communication modem 23 and the external-device connection interface 24 of the relay station 12, and their description will be omitted.

The superframe cycle herein means a communication frame configured by forming superframes each consisting of a downlink time slot for performing a downlink communication, an uplink time slot for performing an uplink communication, and a transmission-request-acceptance time slot for accepting a transmission request from the child station requesting initiation of a transmission, with respect to each of given network-topology units, and forming these superframes as an embedded or nested structure while correlating them to the network topology. The parent station 11 is operable to perform a repetitive transmission in units of the superframe cycle so as to manage transmission rights.

The storage section 32 comprises: a MAC-address storage section 321 for storing the MAC address; an ID storage section 322 for storing the network ID; a path storage section 323 for storing the path and the path discrimination flag; a receiving-environment-table storage section 324 for storing the receiving-environment table; a transmission-quality-table storage section 325 for storing a transmission-quality table representing the respective transmission qualities on the inter-station transmission lines 14; and a path-table storage section 326 for storing a path table correlating the path to the path discrimination flag with respective to each of the relay stations 12 and the child stations 13. The storage unit 32 is operable to store various programs, such as a control program, data required for executing the programs, and data generated during the execution of the programs.

The path herein is information about a route to the parent station 11, and thereby the parent station 11 itself has no need for setting the path. Thus, the path to be stored in the path storage section 323 of the parent station 11 may be any suitable code indicative of its own station or parent station, for example "ROOT". The path discrimination flag to be stored in the path storage section 323 of the parent station 11 may be "Temporary Path" in its initial state, and "Fixed-path" after an after-mentioned operation of setting fixed-paths to respective ones of the relay stations 12.

The central processing unit 31 comprises a basic-information processing section 311, a transmission-quality-evaluation processing section 312, a temporary-path-setting processing section 313, a fixed-path-setting processing section 314, and a power-line-communication processing section 315. The central processing unit 31 is operated according to a control program as described later. The basic-information processing section 311 and the transmission-quality-evaluation processing section 312 are equivalent, respectively, to the basic-information processing section 211 and the transmission-quality-evaluation processing section 212 in the central processing unit 21 of the relay station 12, and their description will be omitted.

The temporary-path-setting processing section 313 is operable to create and update the receiving-environment table and the transmission-quality table. The temporary-path-setting processing section 313 is also operable to set a temporary path to the relay station 12 which has transmitted the receiving-environment table to the parent station, and transmit the set temporary path to this relay station 12 through the power-line communication modem 33. The fixed-path-setting processing section 314 is operable to set fixed-paths to respective ones of the relay stations 12 according to a given algorithm based on the transmission-quality table, and transmit the set fixed-paths to respective ones of the relay stations 12 through the power-line communication modem 33. The power-line-communication processing section 315 is operable to perform the management of transmission rights, and, if needed, a communication control to the network 10, such as the transmission of superframe cycles.

Thirdly, the configuration of the child station 13 will be described. The child station 13 is a terminal device for transmitting and receiving data to/from the parent station 11 by means of power-line communication. For example, as shown in FIG. 4, the child station 13 comprises a central processing unit 41, a storage unit 42, a power-line communication modem 43, and an external-device connection interface 44. The power-line communication modem 43 and the external-device connection interface 44 are equivalent, respectively, to the power-line communication modem 23 and the external-device connection interface 24 of the relay station 12, and their description will be omitted.

The storage section 42 comprises: a MAC-address storage section 421 for storing the MAC address; an ID storage section 422 for storing the network ID; a path storage section 423 for storing the path from its own station to the parent station 11 and the path discrimination flag; and a receiving-environment-table storage section 424 for storing the receiving-environment table. The storage unit 42 is operable to store various programs, such as a control program, data required for executing the programs, and data generated during the execution of the programs.

The central processing unit 41 comprises a basic-information processing section 411, a transmission-quality-evaluation processing section 412, and a receiving-environment processing section 413. The central processing unit 41 is operated according to a control program as described later. The basic-information processing section 411, the transmission-quality- evaluation processing section 412 and the receiving-environment processing section 413 are equivalent, respectively, to the basic-information processing section 211, the transmission- quality-evaluation processing section 212 and the receiving-environment processing section 213 in the central processing unit 21 of the relay station 12, and their description will be omitted.

The operation of this embodiment will be described below.

Operation of Embodiment

Figure 5:
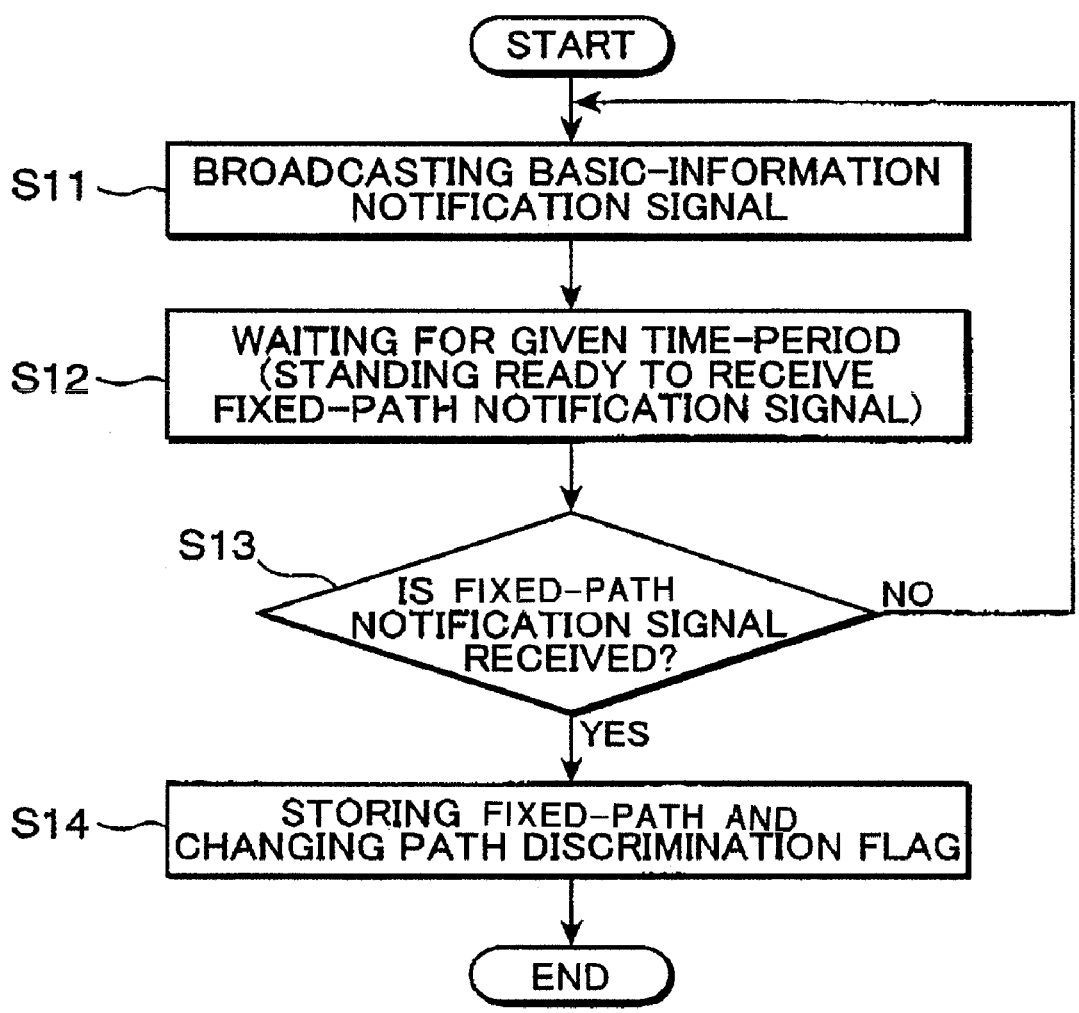
FIG. 5 is a flowchart showing an operation of transmitting basic information in the relay station.
Figure 6:
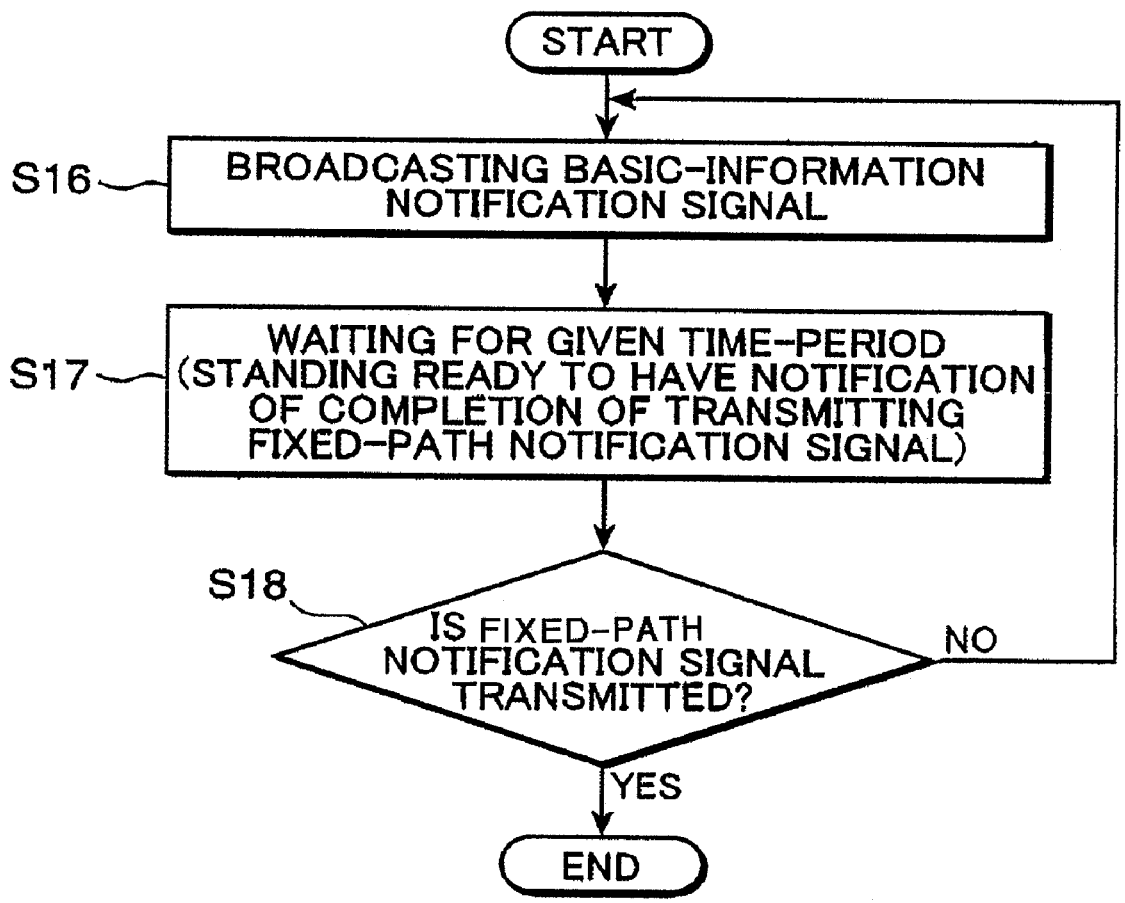
FIG. 6 is a flowchart showing an operation of transmitting basic information in the parent station.
Figure 7:
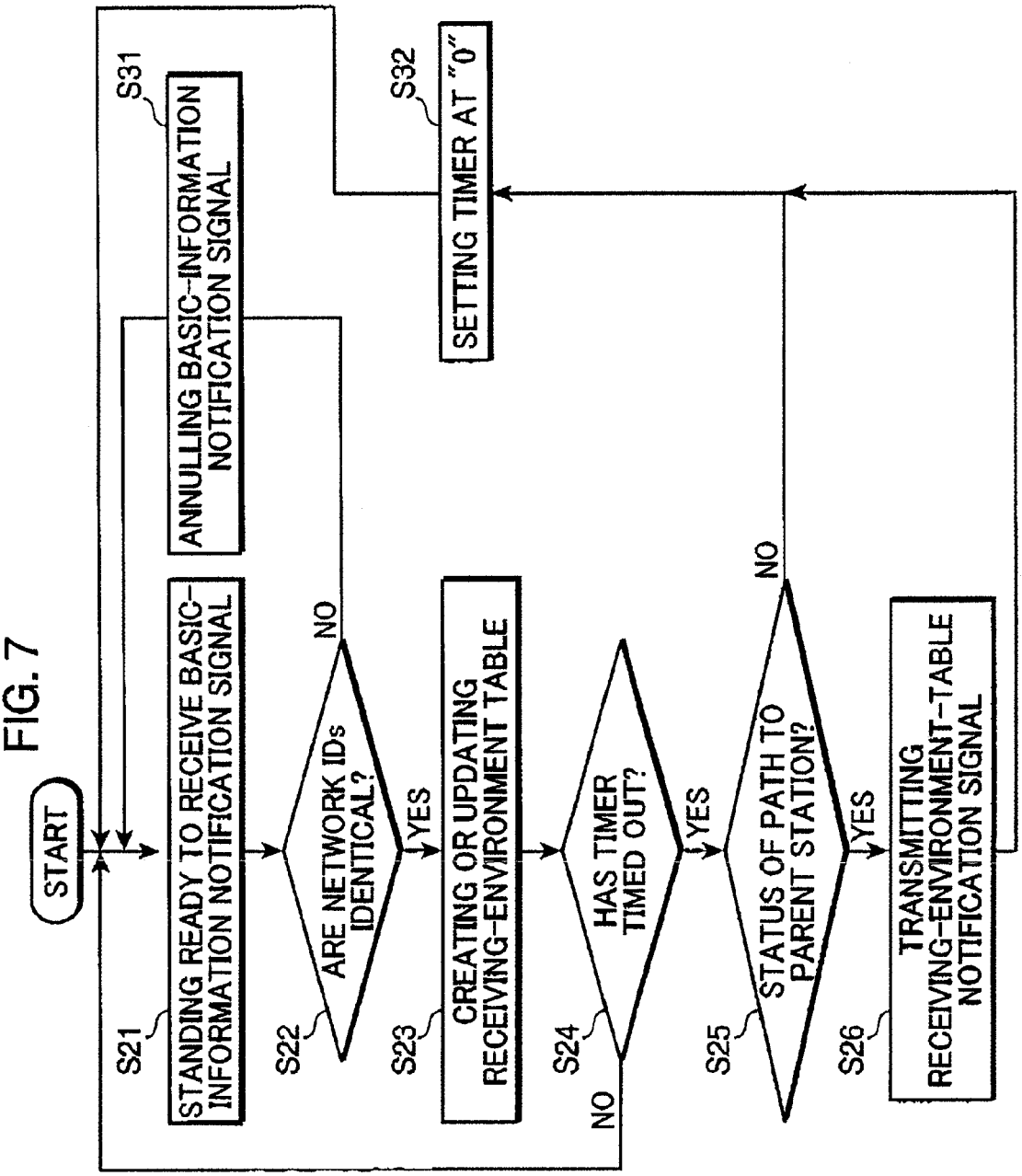
FIG. 7 is a flowchart showing an operation of creating, updating and transmitting a receiving-environment table.
Figure 8:
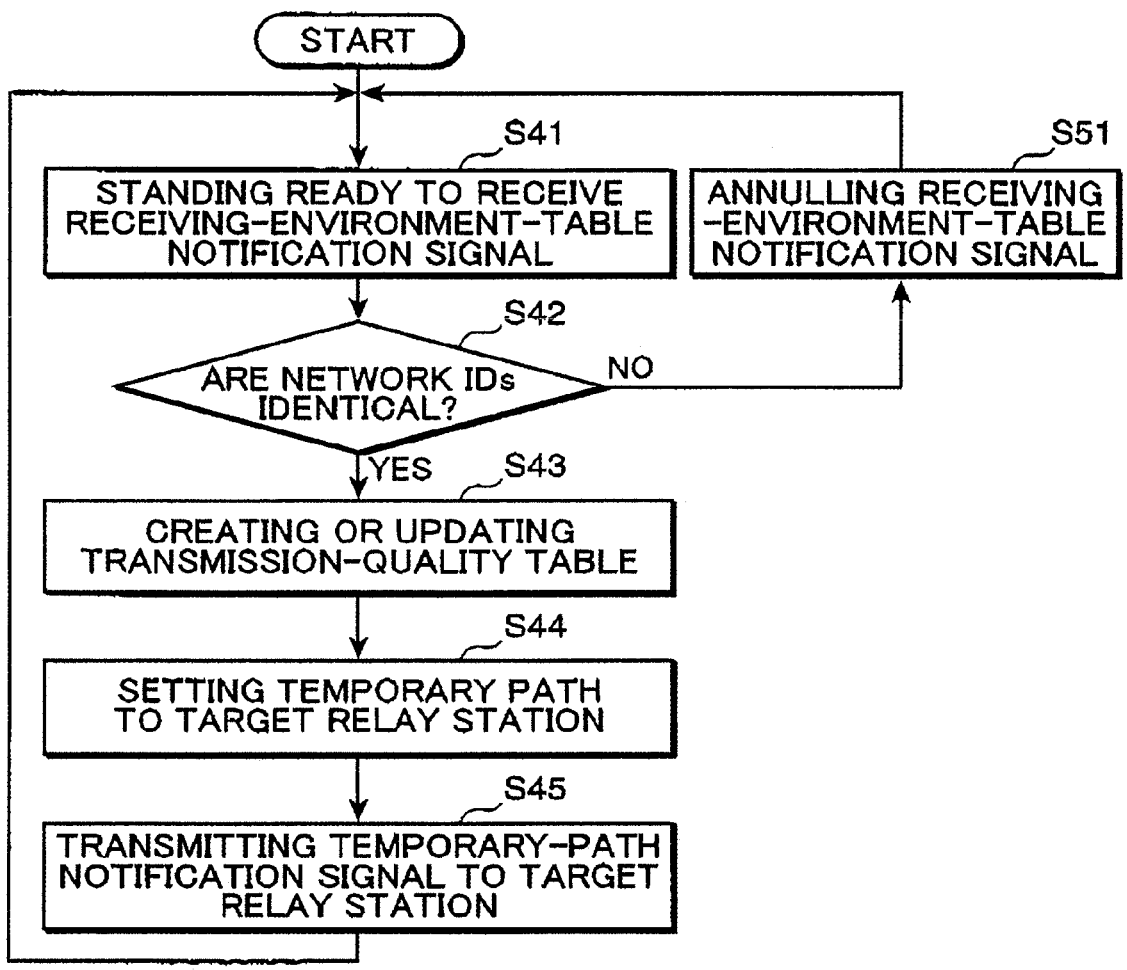
FIG. 8 is a flowchart showing an operation of setting a temporary path.
Figure 9:
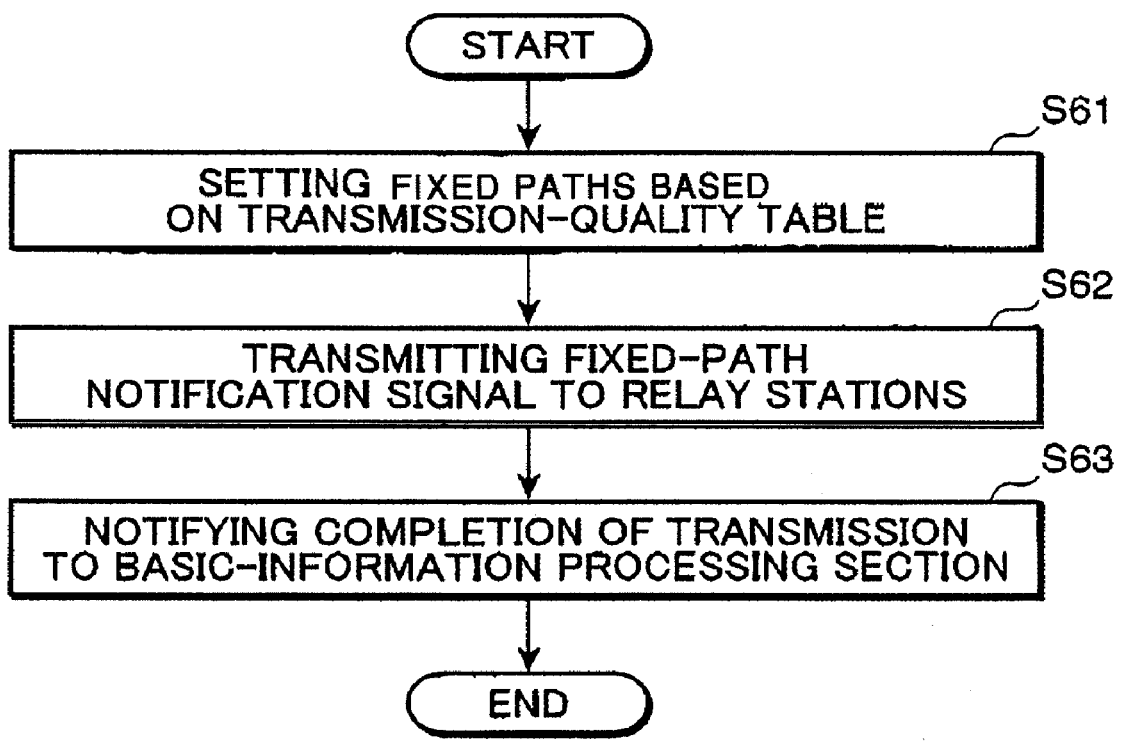
FIG. 9 is a flowchart showing an operation of setting a fixed-path.

FIG. 5 is a flowchart showing an operation of transmitting basic information in each of the relay stations. FIG. 6 is a flowchart showing an operation of transmitting basic information in the parent station. FIG. 7 is a flowchart showing an operation of creating, updating and transmitting a receiving-environment table. FIG. 8 is a flowchart showing an operation of setting a temporary path. FIG. 9 is a flowchart showing an operation of setting a fixed-path.

Firstly, an operation of transmitting basic information to notify the presence of its own station to other stations will be described. A developer or the like who intends to develop the network 10 firstly sets a network ID to each of the parent station 11 and the relay stations 12. For example, this setting operation is performed by connecting a setting device to each of the parent station 11 and the relay stations 12 through the external-device connection interface 34, 24, and inputting the network ID from the setting device thereto. In response to the input of the network ID, each of the parent station 11 and the relay stations 12 stores the network ID in the ID storage section 322, 222 of the storage unit 32, 22 thereof. After setting the network ID, the developer or the like turns on the power of the parent station 11 and the relay stations 12.

In FIG. 5, in response to turning on the power, the basic-information processing section 211 in each of the relay stations 12 generates a communication signal (basic-information notification signal) containing basic information, and broadcasts this basic-information notification signal to the network 10 using a CSMA/CA protocol (S11).

As is well known in the art, the CSMA/CA protocol is means for allowing a node to transmit intended data only after confirming that there is no communication signal on a transmission line for a given continuous period of time or more. While a CSMA/CD (Carrier Sense Multiple Access with Collision Detection) protocol has been known as one media access control (MAC) means other than the CSMA/CA protocol, the CSMA/CA protocol is more preferable than the CSMA/CD protocol, because a distribution line (power line) in the power-line communication is originally intended to supply electric power, and thereby communications to the entire nodes are not always assured.

The basic information in this embodiment consists of a device type, a MAC address, the setting status of a path relative to the parent station 11 (hereinafter referred to as "path-setting status"), and a network ID. The device type means either one of the parent station 11, the relay station 12 and the child station 13. For example, in the basic-information notification signal, "BST", "RPT" and "RMT" are used as identifiers indicative of the parent station 11, the relay station 12 and the child station 13, respectively. The path-setting status is indicated by one of "non-completion of path setting", "completion of temporary-path setting" and "completion of fixed-path setting". This path-setting status is selectively determined by referring to the path discrimination flag in the path storage section 223, 323. For example, in the basic-information notification signal, "PERM", "TEMP" and "VAC" are used as identifiers indicative of the "completion of fixed-path setting", the "completion of temporary-path setting" and the "non-completion of path setting", respectively. The basic-information processing section 211 refers to the respective stored contents of the MAC-address storage section 211, the ID storage section 222 and the path storage section 323 to generate the basic-information notification signal. The device type may be written directly in the control program itself for the relay station 12. Alternatively, the storage unit 22 may be provided with a type storage section for storing the device type.

Then, the basic-information processing section 211 of the relay station 12 discontinues (waits) the processing for a given time period while standing ready to receive a communication signal (fixed-path notification signal) containing information about a fixed-path (S12), and determines whether a fixed-path notification signal is received (S13). As the result of the determination, when a fixed-path notification signal is received (YES), the basic-information processing section 211 of the relay station 12 instructs the path storage section 223 to store the fixed-path therein, and changes the path discrimination flag to "10" indicating that the path is a fixed-path (S14). Then, the processing is completed. When no fixed-path notification signal is received (No), the basic-information processing section 211 of the relay station 12 returns the processing to S11.

In FIG. 6, concurrently, the basic-information processing section 311 of the parent station 11 generates a basic-information notification signal in response to turning on the power, and broadcasts this basic-information notification signal to the network 10 using a CSMA/CA protocol (S16). In this operation, while the basic-information notification signal transmitted from the parent station 11 may contain "TEMP" as the path-setting status, an identifier indicative of the parent station 11 itself, for example "BST", may also be used to clearly indicate that a sender or transmitter of the basic-information notification signal is the parent station 11 itself, as in this embodiment. In this case, the identifier "BST" indicative of the parent station 11 itself which is provided in addition to "TEMP" allows the relay station 12 receiving the basic-information notification signal containing "BST" as the path-setting status to immediately determine that a communication signal can be transmitted and received to/from the parent station 11 through the transmission line 14 used for receiving the above basic-information notification signal.

Then, the basic-information processing section 311 of the parent station 11 discontinues (waits) the processing for a given time period while standing ready to have a notification of completion of transmitting the fixed-path notification signal (S17), and determines whether the completion of transmitting the fixed-path notification signal is notified (S18). As the result of the determination, when the completion of the transmission is notified (YES), the basic-information processing section 311 of the parent station 11 completes the processing. When the completion of the transmission is not notified (NO), the basic-information processing section 311 of the parent station 11 returns the processing to S16.

As above, each of the parent station 11 and the relay stations 12 repeats the broadcast of the basic-information notification signal at a constant time interval until the completion of setting fixed-paths.

Secondly, an operation of creating and updating a receiving-environment table, and transmitting the receiving-environment table will be described. In FIG. 7, during the above broadcast communications of the basic-information notification signal, the receiving-environment processing section 213 in each of the relay stations 12 stands ready to receive a basic-information notification signal (S21), and, in response to receiving the basic-information notification signal, determines whether a network ID contained in the basic-information notification signal is identical to the network ID stored in the ID storage section 222 (S22).

As the result of the determination, when the respective network IDs are not identical to one another (NO), the receiving-environment processing section 213 of the relay station 12 annuls the received basic-information notification signal (S31), and returns the processing to S21. That is, the receiving-environment processing section 213 of the relay station 12 returns to the state of standing ready to receive a basic-information notification signal. The power-line communication modem section 23 may be configured to perform the processing at S22. In this case, the power-line communication modem section 23 may be configured such that it can annul a basic-information notification signal received thereat. As the result of the determination, when the respective network IDs are identical to one another (YES), the transmission-quality-evaluation processing section 212 acquires a receiving intensity of the received basic-information notification signal from the power-line communication modem 23 to calculate a transmission quality, and notifies the calculation result to the receiving-environment processing section 213. Then, the receiving-environment processing section 213 of the relay station 12 creates or updates a receiving-environment table in accordance with the basic information contained in the received basic-information notification signal and the transmission quality from the transmission-quality-evaluation processing section 212 (S23). In this way, the transmission quality can be correlated to the basic information, particularly the MAC address and the path-setting status, to recognize the transmission quality of the transmission line 14 between its own station and the station having the MAC address, and recognize whether communications with the parent station 11 can be performed through the use of the transmission line 14 between its own station and the station having the MAC address. The MAC address serves as not only a data-link-layer address but also an identifier identifying each of the stations.

Then, the receiving-environment processing section 213 of the relay station 12 determines whether a timer has timed out (S24). For example, the timer is a software timer, and configured to be set at "0 (zero)" in conjunction with the activation of the relay station 12. In view of allowing each of the relay stations 12 to reliably receive basic-information notification signals from all of other stations therearound, a timeout period of the timer is set at a time period greater than that of the discontinuation of the processing (wait time) at S12 in FIG. 5. As the result of the determination, when the timer has not timed out (NO), the receiving-environment processing section 213 of the relay station 12 returns the processing to S21. As the result of the determination, when the timer has timed out (YES), the receiving-environment processing section 213 of the relay station 12 determines the path-setting status in the receiving-environment table (S25).

As the result of determination, when the setting status of a path to the parent station 11 is "non-completion of path setting" (VAC) in the entire records of the receiving-environment table (NO), the receiving-environment processing section 213 of the relay station 12 sets the timer at "0 (zero)" (S32), and then returns the processing to S21. As the result of determination, when the setting status of a path to the parent station 11 is "completion of temporary-path setting" (TEMP) in either one of the records of the receiving-environment table (YES), the receiving-environment processing section 213 of the relay station 12 transmits a communication signal (receiving-environment-table notification signal) containing the content of the receiving-environment table by means of a unicast using the MAC address of the record having the "TEMP" (S26), and returns the processing to S21 after performing the processing at S32. In the case where the parent station 11 transmits a basic-information notification signal containing the identifier "BST" indicative of the parent station 11 itself, when the path-setting status is "BST" in either one of the records of the receiving-environment table, the receiving-environment processing section 213 of the relay station 12 also transmits the receiving-environment-table notification signal to the parent station 11 by means of a unicast (S26), and returns the processing to S21 after performing the processing at S32.

Then, if another relay station 12 receives the receiving-environment-table notification signal, it will forward the received receiving-environment-table notification signal to the parent station 11 through the use of a temporary path thereto, for example, according to an interrupt handling in the receiving-environment processing section 213 thereof.

Through the above operation, the relay station 12 transmits the receiving-environment table directly to the parent station 11 or to another relay station 12 having a temporary path set thereto, at a given time interval. Then, the another relay station 12 forwards the received receiving-environment table to the parent station 11 through the use of the temporary path. Further, in response to receiving a basic-information notification signal at any time before the transmission of a receiving-environment table, the relay station 12 newly creates a receiving-environment table when no receiving-environment table is created therein, or updates the content of a receiving-environment table which has already been created therein. Thus, the parent station 11 can receive receiving-environment-table notification signals directly from each of the relay stations 12 or through the forwarding of other relay stations 12, to acquire respective receiving-environment tables of the relay stations 12.

Thirdly, an operation of setting a temporary path will be described. In FIG. 8, during the broadcast communication of the basic-information notification signal according to the flowchart illustrated in FIG. 5, the temporary-path processing section 313 of the parent station 11 stands ready to receive a receiving-environment-table notification signal (S41), and, in response to receiving a receiving-environment-table notification signal, determines whether a network ID contained in the receiving-environment-table notification signal is identical to the network ID stored in the ID storage section 322 (S42). Even in a case where a receiving-environment table consists of a plurality of records each having a network ID registered therein, these network IDs are identical to each other. Thus, the network ID of either one of the records, for example the 1st record, is compared with the network ID stored in the ID storage section 322.

As the result of the determination, when the network IDs are not identical to one another (NO), the temporary-path processing section 313 of the parent station 11 annuls the received receiving-environment-table notification signal (S51), and returns the processing to S41. That is, the temporary-path processing section 313 of the parent station 11 returns to the state of standing ready to receive a receiving-environment-table notification signal. The power-line communication modem section 23 may be configured to perform the processing at S42. In this case, the power-line communication modem section 23 may be configured such that it can annul a receiving-environment-table notification signal received thereat. As the result of the determination, when the network IDs are identical to one another (YES), the temporary-path processing section 313 of the parent station 11 creates or updates the transmission-quality table in accordance with the receiving-environment table contained in the received receiving-environment-table notification signal (S43). Then, the temporary-path processing section 313 of the parent station 11 sets a temporary path to the target relay station 12 which has transmitted the receiving-environment-table notification signal (S44), and, after transmitting to the target relay station 12 a communication signal (temporary-path notification signal) containing information about the set temporary path (S45), returns the processing to S41.

In this operation, the temporary path is intended to collect respective receiving-environment tables held by the relay stations 12. Thus, as long as the temporary path allows a communication signal to be reliably transmitted from the parent station 11 to the target relay station 12 which has transmitted the receiving-environment-table notification signal, it may be freely set. For example, the temporary path is set by selecting the transmission line 14 essentially having a given transmission-quality index value or more, specifically a PLR value of 4 or more in this embodiment. By way of exception, if there is not any transmission line 14 having the given transmission-quality index value or more, the temporary path is set by selecting the transmission line 14 having the best transmission-quality index value. The temporary-path processing section 313 of the parent station 11 may be configured such that it refers to the path table stored in the path-table storage section 326 to check the path-setting status, and then performs the processing at S44 and S45. This configuration makes it possible to avoid an undesirable situation where a temporary path is set to the same relay station 12 plural times.

Then, the central processing unit 21 of the target relay station 12 which has received the temporary-path notification signal instructs the path storage section 213 to store therein the temporary path contained in the received temporary-path notification signal, and changes the path discrimination flag from "00" to "01".

Through the above operation, the parent station 11 completes the transmission-quality table stepwise in order of the transmission line 14 interconnecting with the closest relay station 12 to the transmission line 14 interconnecting with the farthest relay station 12 relative to the parent station 11 in terms of network topology, while receiving receiving-environment-table notification signals by means of a unicast, and sets temporary paths to respective ones of the relay stations 12 which have the transmitted receiving-environment-table notification signals. If the temporary path set in this way has a PLR value of "0 (zero)" due to deterioration in line environment or conditions of the transmission line 14, or the parent station 11 receives a "communication signal notifying that a path to the parent station 11 becomes invalid", from the relay station 12 located upstream of the temporary path by means of a broadcast, the temporary path will be annulled, and a new temporary path will be re-set according to the aforementioned operation.

Fourthly, an operation of setting a fixed-path will be described. In FIG. 9, after a lapse of a time period greater than the timeout period of the timer in FIG. 7, or a lapse of a time period sufficient to set temporary paths to respective ones of the entire relay stations 12 and collect the receiving-environment tables held by the entire relay stations 12, the fixed-path-setting processing section 314 of the parent station 11 calculates and sets fixed-paths according to a given algorithm based on the transmission-quality table (S61), and transmit a fixed-path notification signal containing the set fixed-paths to respective ones of the relay stations 12 (S62). In response to the completion of transmitting the fixed-path notification signal to the relay stations 12, the fixed-path-setting processing section 314 notifies the completion of the transmission to the basic-information processing section 311 (S63). Then, the basic-information processing section 211 of each of the relay stations 12 which have received the fixed-path notification signal updates the stored content of the path storage section with the fixed-path contained in the fixed-path notification signal, and changes the path discrimination flag from "01" to "10" (S14 in FIG. 5).

Each of the fixed-paths can be calculated using an algorithm for deriving the shortest route from one designated node to each of the remaining nodes, for example well-known Dijkstra's algorithm, in a weighted graph. In the main lines of the network 10, the node means the parent station 11 or each of the relay stations 12, wherein the designated node corresponds to the parent station 11, and the remaining nodes correspond to the relay stations 12. Further, the weighting factor is the PLR value or a value based on the PLR value. For example, the PLR-value-based value f (PLR) is calculated by the following formula 2:

$$f(PLR)=(PLR_{max}^2+1)-PLR^2, \quad (2)$$

wherein $PLR_{max}$ is a theoretical maximum possible value of PLR, and PLR is an evaluated value described in the transmission-quality table.

Through the above operation, the parent station 11 sets fixed-paths in accordance with the transmission-quality table to develop a network configuration. This technique of allowing the parent station 11 to dynamically develop a network configuration makes it possible to eliminate any need for a network developer or administrator to investigate the situation of a construction site and manually develop a network configuration as in the conventional technique, and the need for setting a path to each station. Thus, the developer or administrator can cut out the required time and effort therefor and eliminate the need for managing the network configuration.

With a focus on the relay station a 12-a and the relay station c 12c, the process of developing the configuration of the network 10 illustrated in FIG. 1 and setting fixed-paths according to the aforementioned operations will be specifically described.

Figures 10A, 10B:
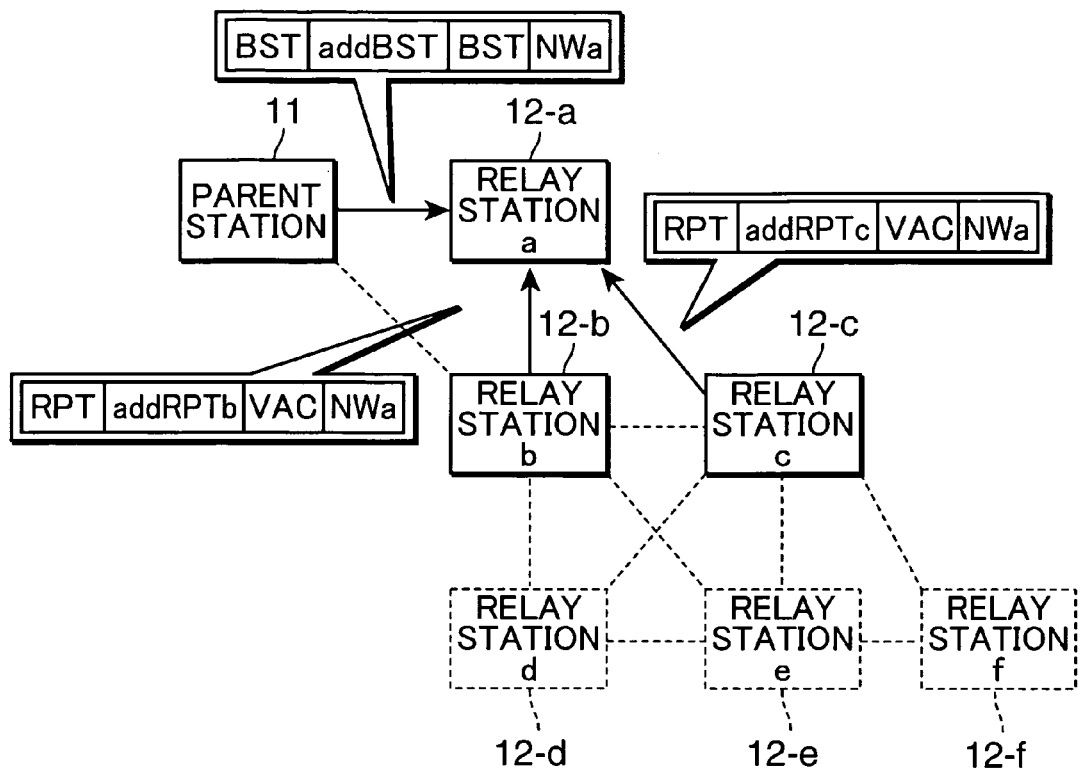
FIG. 10 illustrates the status of a relay station a at Time $T_1$.
Figures 11A, 11B:
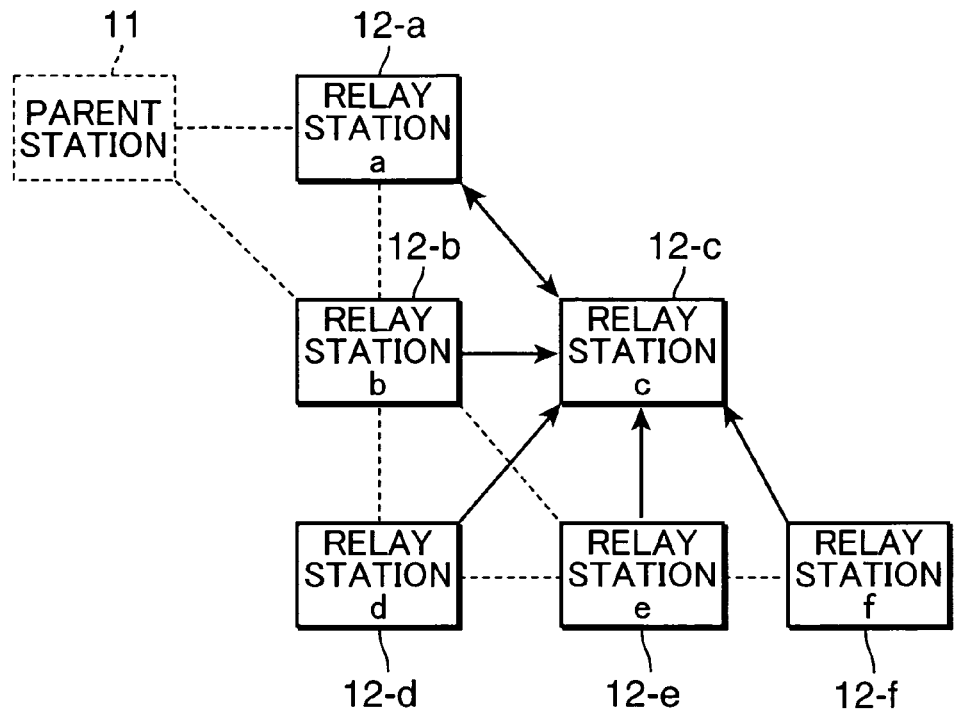
FIG. 11 illustrates the status of a relay station c at Time $T_1$.
Figures 13A, 13B:
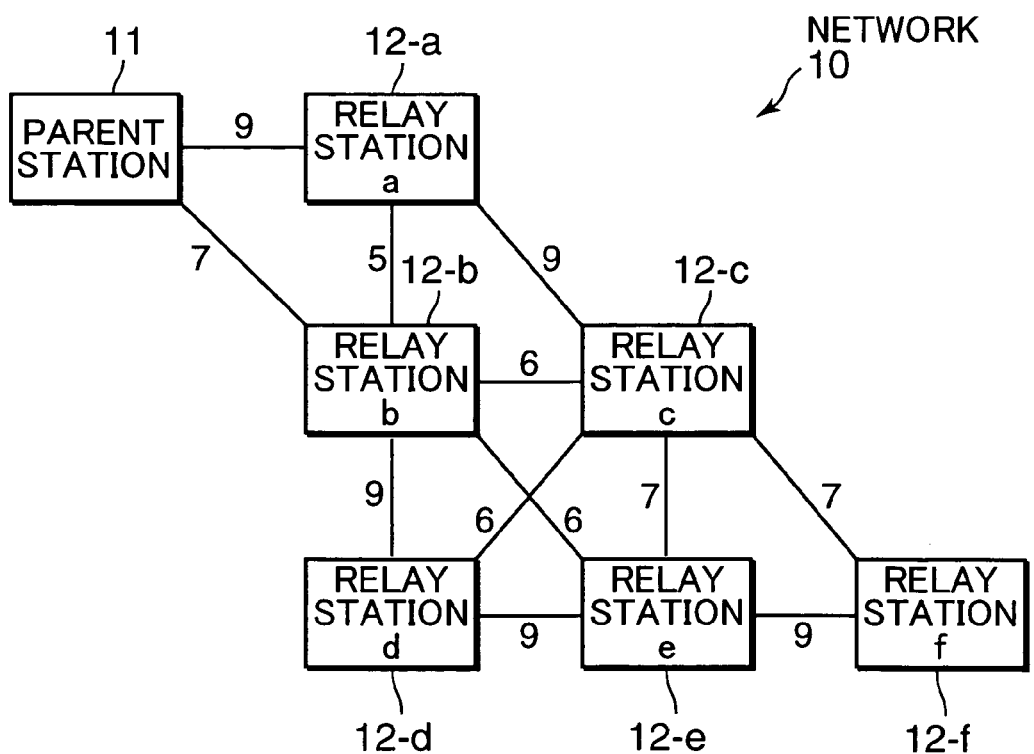
FIG. 13 is a diagram showing a transmission-quality table and a PLR value of each transmission line in the network after receiving the receiving-environment tables from all of the relay stations.
Figure 14A:
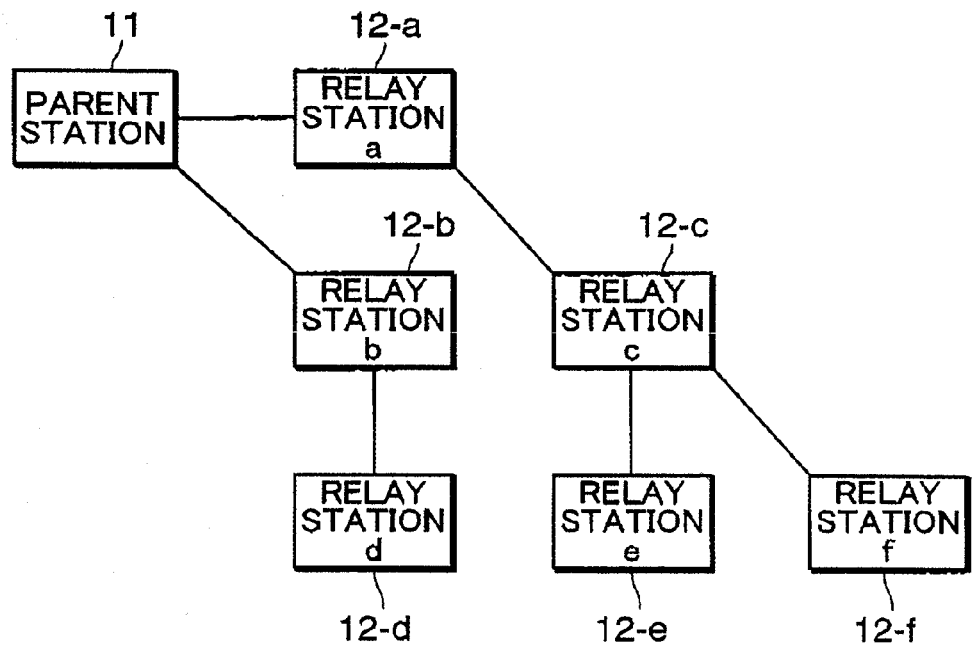
FIG. 14 is a block diagram showing network configurations.
Figure 14B:
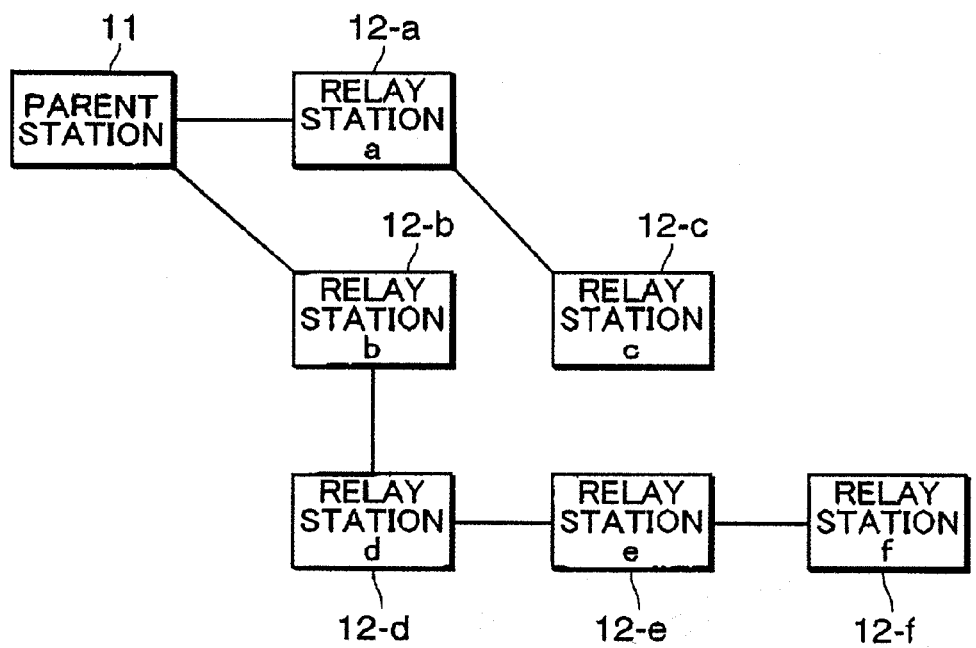

FIG. 10 illustrates the status of the relay station a at Time $T_1$, wherein FIG. 10A shows basic-information notification signals to be received by the relay station a, and FIG. 10B shows a receiving-environment table of the relay station a which is created based on the received basic-information notification signals. FIG. 11 illustrates the status of the relay station c at Time $T_1$, wherein FIG. 11A shows basic-information notification signals to be received by the relay station c, and FIG. 11B shows a receiving-environment table of the relay station c which is created based on the received basic-information notification signals. FIG. 12 is a diagram showing the receiving-environment table of the relay station c at Time $T_2$. FIG. 13 is a diagram showing a transmission-quality table and a PLR value of each transmission line in the network after receiving the receiving-environment tables from all of the relay stations, wherein FIG. 13A shows the transmission-quality table, and FIG. 13B shows the PLR value of each transmission line in the network. In FIG. 13, each PLR value of the paths between the parent station 11 and each of the relay stations 12 and between the stations 12 is described on the assumption that it has the same value in both directions, for simplifying the explanation. FIG. 14 is a block diagram showing network configurations, wherein FIG. 14A shows a network configuration after setting temporary paths, and FIG. 14B shows a network configuration after setting fixed-paths.

The parent station 11 and the relay stations 12 are activated, so that a basic-information notification signal is broadcasted from the parent station 11 according to the operation illustrated in FIG. 6, and a basic-information notification signal is broadcasted from each of the relay stations 12 according to the operation illustrated in FIG. 5.

As time advances, the relay station a 12-a repeats the processing at S21, S22, S23 and S24 in FIG. 7 to sequentially receive the basic-information notification signal of the parent station 11 (communication signal containing "BST", "addBST", "BST" and "NWa"), the basic-information notification signal of the relay station b 12-b (communication signal containing "RPT", "addRPTb", "VAC" and "NWa"), and the basic-information notification signal of the relay station c 12-c (communication signal containing "RPT", "addRPTc", "VAC" and "NWa"), as shown in FIG. 10A, so as to create or update a receiving-environment table. Then, at Time $T_1$, the receiving-environment table is formed as shown in FIG. 10B in accordance with the above basic-information notification signals. The "addBST", "addRPTb" and "addRPTc" are MAC addresses of the parent station 11, the relay station b 12-b and the relay station c 12-c. The "NWa" is a network ID of this network 10. The receiving-environment table in FIG. 10B includes a plurality of fields for registering a device type, a MAC address, a path-setting status, a network ID, and a PLR value. In this table, a record is created with respect to each MAC address, or each transmission line 14 between its own station and another station identified by the MAC address.

Concurrently, the relay station c 12-c repeats the processing at S21, S22, S23 and S24 in FIG. 7 to sequentially receive the basic-information notification signal of the relay station a 12-a (communication signal containing "RPT", "addRPTa", "VAC" and "NWa"), the basic-information notification signal of the relay station b 12-b (communication signal containing "RPT", "addRPTb", "VAC" and "NWa"), the basic-information notification signal of the relay station d 12-d (communication signal containing "RPT", "addRPTd", "VAC" and "NWa"), the basic-information notification signal of the relay station e 12-e (communication signal containing "RPT", "addRPTe", "VAC" and "NWa"), and the basic-information notification signal of the relay station f 12-f (communication signal containing "RPT", "addRPTf", "VAC" and "NWa"), as shown in FIG. 11A, so as to create or update a receiving-environment table. Then, at Time $T_1$, the receiving-environment table is formed as shown in FIG. 11B in accordance with the above basic-information notification signals. The "addRPTd", "addRPTe" and "addRPTf" are MAC addresses of the relay station d 12-d, the relay station e 12-e and the relay station f 12f.

As shown in FIG 10B, the relay station a 12-a has a record where "BST" is registered in the field of path-setting status. Thus, in response to timeout of the timer in the processing at S24 in FIG. 7, S25 in the processing of FIG. 7 advances to S26 in which the relay station a 12-a transmits the receiving-environment table to the parent station 11. In contrast, as shown in FIG 11B, the relay station c 12-c does not have any record where "BST" or "TEMP" is recorded in the field of path-setting status. Thus, in the processing of FIG. 7, S25 advances to S32, and then returns to S21.

Then, the receiving-environment-table notification signal transmitted from the relay station a 12a is received by the parent station 11 at S41 in FIG. 8. The parent station 11 sets a temporary path according to the operation illustrated in FIG. 8, and returns a temporary-path notification signal to the relay station a 12-a. In response to receiving the temporary-path notification signal, the relay station a 12a changes the status of connection to the parent station from "VAC" to "TEMP", and broadcasts a basic-information notification signal having a path-setting state of "TEMP" (communication signal containing "RPT", "addRPTa", "TEMP" and "NWa") according to the operation illustrated in FIG. 5.

Thus, at Time $T_2$ after time further advances, the relay station c 12-c repeating the processing at S21, S22, S23 and S24 in FIG. 7 receives the basic-information notification signal having a path-setting state of "TEMP", and updates the receiving-environment table to provide an updated receiving-environment table as shown in FIG. 12. The relay station c 12-c also receives a basic-information notification signal having a path-setting state of "TEMP" from the relay station b 12-b.

When the timer in the processing at S24 in FIG. 7 times out, the relay station c 12c has a record where "TEMP" is registered in the field of path-setting status, as shown in FIG. 12. Thus, in the processing of FIG. 7, S25 advances to S26 in which the relay station c 12-c transmits the receiving-environment table to another relay station 12 which has transmitted a basic-information notification signal containing "TEMP". In this operation, if a plurality (two in this example) of records where "TEMP" is registered in the filed of path-setting status exist as shown in FIG. 12, the receiving-environment table may be transmitted through any one of such relay stations 12. However, in view of reliable transmission to the parent station 11, it is desirable to compare between respective PLR values of the records, and select the relay station 12 having a record with a higher PLR value. In the example as shown in FIG. 12, the relay station c 12-c compares a record having a PLR value of 6 with a record having PLR value of 9, and transmits a receiving-environment table to the relay station a 12-a interconnecting with the transmission line 14 having a PLR value of 9.

Then, the receiving-environment-table notification signal transmitted by the relay station c 12-c is received by the parent station 11 at S41 in FIG. 8. The parent station 11 sets a temporary path according to the operation illustrated in FIG. 8, and returns a temporary-path notification signal to the relay station c 12-c. In response to receiving the temporary-path notification signal, the relay station c 12-c changes the status of connection to the parent station from "VAC" to "TEMP", and broadcasts a basic-information notification signal having a path-setting state of "TEMP" (communication signal containing "RPT", "addRPTc", "TEMP" and "NWa") according to the operation illustrated in FIG. 5.

In this manner, temporary paths are set to respective ones of the relay stations 12 in order of the relay station closer to the parent station 11 in terms of network topology. When the receiving-environment table notification signals are received from all of the relay stations 12, a transmission-quality table as shown in FIG. 13 is created in the parent station 11. This transmission-quality table is formed as a matrix table of identifiers indicative of transmitting stations and identifiers indicative of receiving stations, wherein a PLR value on a transmission line between the above transmitting and receiving stations is registered in each of the fields on the matrix. The PLR values on the respective transmission lines 14 can be network-topologically represented as shown in FIG. 13B. The numerical value appended to each of the transmission lines 14 is the PLR value on the transmission line 14. For example, the transmission line 14-xa has a PLR value of 9, and the transmission line 14-ce has a PLR value of 7.

After the creation of the transmission-quality table, the parent station 11 calculates fixed-paths according to the operation in FIG. 9, and notifies the fixed-paths to respective ones of the relay stations 12. For example, fixed-paths as shown in FIG. 14B are calculated from temporary paths as shown in FIG. 14A.

As already mentioned, in power-line communications, the transmission quality on the transmission line 14 can be dynamically changed. Thus, after setting of the fixed-paths, each of the parent station 11 and the relay stations 12 may keep on calculating a PLR value every time a communication signal is received, and if one of the relay stations 12 has a PLR value of a given value or less, for example 3 or less, it may broadcast a communication signal requesting for re-setting the fixed-path, to the network 10. Then, in response to receiving this communication signal, the parent station 11 and the remaining relay stations 12 may perform the operations illustrated in FIGS. 5 to 9 to re-set the fixed-paths. This technique makes it possible to cope with communication failures due to the above phenomenon.

Alternatively, after setting of the fixed-paths, each of the parent station 11 and the relay stations 12 may keep on calculating a PLR value every time a communication signal is received, and if one of the relay stations 12 has a PLR value of a given value or less, it may transmit a communication signal requesting for re-setting the fixed-path, to the parent station 11, and the parent station 11 may request the relay stations 12 to transmit their transmission qualities, by means of polling. Then, the parent station 11 may re-set the fixed-paths in accordance with collected transmission qualities, and transmit the re-set fixed-paths to the relay stations 12. This technique makes it possible to quickly cope with the communication failures.

Alternatively, after setting of the fixed-paths, each of the parent station 11 and the relay stations 12 may keep on calculating a PLR value every time a communication signal is received, and if one of the relay stations 12 has a PLR value of a given value or less, it may transmit a communication signal requesting for re-setting the fixed-path, to the parent station 11. Then, the parent station 11 may immediately re-set the fixed-path in accordance with the transmission-quality table of the parent station 11, and transmit them to the relay stations 12. The parent station 11 stores the transmission qualities of the transmission lines 14 in the network 10 after the operation of setting the initial fixed-paths. This allows the paths to be immediately re-set using the above technique so as to further quickly cope with the communication failures.

Alternatively, after setting of the fixed-paths, each of the parent station 11 and the relay stations 12 may keep on calculating a PLR value every time a communication signal is received. The parent station 11 may request the relay stations 12 to transmit their transmission qualities, at a given time interval by means of polling, and re-set the fixed-paths in accordance with collected transmission qualities. Then, the parent station 11 may compare the current fixed-paths with the re-set fixed-paths, and present the change therebetween to outside, if any. For example, according to this technique, a network administrator can compare the current fixed-paths with the re-set fixed-paths to select better fixed-paths. For example, the presentation to outside can be achieved by providing a display, such as CRT or CLD, in the parent station 11, and displaying the result of the comparison between the current fixed-paths with the re-set fixed-paths thereon. In addition to display, a light-emitting device, such as LED or lamp, or a sound source, such as speaker or buzzer, may be provided in the parent station to inform the change with light or sound. Alternatively, the current and re-set fixed-paths and the result of the comparison therebetween may be displayed on a display of a remote device connected to the parent station 11 via a communication network, by use of web technologies.

While the above description has been made in connection with the path setting operation for the main lines consisting of the parent station 11 and the relay stations for simplifying the explanation, the child station 13 may be configured to operate as with the relay station 12 so that a path can be set to the entire network 10 including the child station 13 in the same manner as that described above.

Through the aforementioned operations, the configuration of the network 10 comprising the parent station 11, the relay stations 12 and the child stations 13 is established. The following description is made about operations in cases where a child station 13 or a relay station 12 is added to the network 10 having the established configuration. Firstly, an operation in a case where a child station 13 is added to the network will be described.

Figure 15:
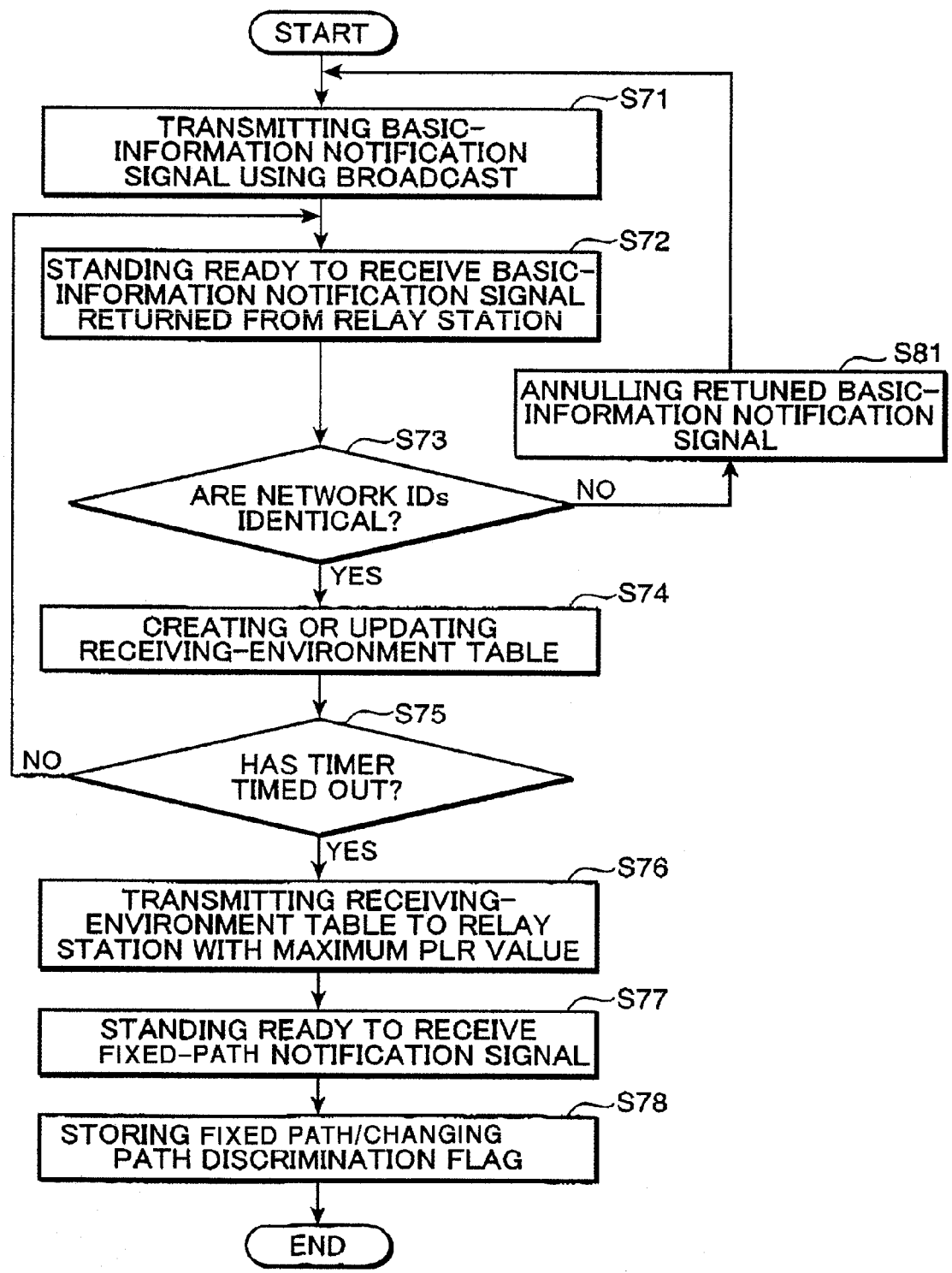
FIG. 15 is a flowchart showing an operation in cases where a child station is added to the network.

FIG. 15 is a flowchart showing an operation in a case where a child station 13 is added to the network. A user of a child station 13 sets a network ID, and connects the child station 13, for example, to a distribution line through a plug. For example, the network ID is notified from an administrator of the network 10 by mail, facsimile or telephone. Alternatively, the network administrator of the network 10 may set a network ID to the child station 13, and then give it to the user. In FIG. 15, the basic-information processing section 411 of the child station 13 generates a basic-information notification signal in response to the connection to the network, and transmits it by means of a broadcast using a CSMA/CA protocol (S71). Then, the basic-information processing section 411 stands ready to receive a basic-information notification signal returned from the relay station 12 (S72).

In response to receiving the basic-information notification signal from the child station 13, the relay station 12 updates its own receiving-environment table in accordance with the received basic-information notification signal, and returns a basic-information notification signal containing its own basic information.

In response to receiving the basic-information notification signal returned from the relay station 13, the receiving-environment processing section 413 of the child station 13 determines whether the network ID contained in the returned basis-information notification signal is identical to the network ID stored in the ID storage section 422 of the child station 13 (S73).

As the result of the determination, when the respective network IDs are not identical to one another (NO), the receiving-environment processing section 413 of the child station 13 annuls the received basic-information notification signal (S81), and returns the processing to S72. That is, the receiving-environment processing section 413 of the child station 13 returns to the state of standing ready to receive a basic-information notification signal. As the result of the determination, when the respective network IDs are identical to one another (YES), the transmission-quality-evaluation processing section 412 of the child station 13 acquires a receiving intensity of the received basic-information notification signal from the power-line communication modem 43 to calculate a transmission quality, and notifies the calculation result to the receiving-environment processing section 413. Then, the receiving-environment processing section 413 of the child station 13 creates or updates a receiving-environment table in accordance with the basic information contained in the received basic-information notification signal and the transmission quality from the transmission-quality-evaluation processing section 413 (S74).

Then, the receiving-environment processing section 412 of the child station 13 determines whether a timer has timed out (S75). For example, the timer is configured to be set at "0 (zero)" in conjunction with the activation of the child station 13. As the result of the determination, when the timer has not timed out (NO), the receiving-environment processing section 413 of the child station 13 returns the processing to S72. As the result of the determination, when the timer has timed out (YES), the receiving-environment processing section 413 of the child station 13 compares between PLR values in the receiving-environment table to retrieve the relay station having a maximum PLR value, and transmits a communication signal (receiving-environment/basic-information notification signal) containing the receiving-environment table and the basic information of the child station 13 to the retrieved relay station 12, by means of a unicast (S76). Then, the child station 13 stands ready to receive a fixed-path notification signal (S77).

A timeout period of the timer is appropriately set at a time period allowing the child station 13 to sufficiently receive basic-information notification signals returned from the relay stations 12 therearound. Further, if a plurality of relay stations 12 have a maximum PLR value, one of the relay stations will be selected by a given selection method. For example, the given selection method may be to select the relay station 12 having a smaller size of MAC address, or to select the relay station 12 whose returned basic-information notification signal has been received at an earlier time.

In response to receiving the receiving-environment/basic-information notification signal returned from the child station 13, the relay station 12 which has returned the basic-information notification signal forwards the receiving-environment/basic-information notification signal received from the child station 13, to the parent station 11. Then, based on the forwarded receiving-environment/basic-information notification signal of the child station 13, the parent station 11 determines that the child station 13 is added, and updates the transmission-quality table in accordance with the receiving-environment table in the receiving-environment/basic-information notification signal. Further, the parent station 11 sets a communication route used for transmitting/forwarding the receiving-environment/basic-information notification signal of the child station 13, as a fixed-path from the child station 13 to the parent station 11. Then the parent station 11 transmits a fixed-path notification signal containing the set fixed-path to the child station 13. While a fixed-path may be re-calculated in accordance with an updated transmission-quality table according to the aforementioned algorithm and set to include an additional child station 13, it is only necessary to set a path to the relay station 12 having the highest PLR value relative to the additional child station 13. Alternatively, a communication route may be used for transmitting/forwarding the receiving-environment/basic-information notification signal of the child station 13. The addition of the child station 13 does not change main lines of the network 10 including the parent station 11, the relay stations 12 and the transmission line (distribution line) 14. According to the above operation of setting a fixed-path to an additional child station 13, a fixed-path can be quickly set, and a calculation load in the parent station 11 can be reduced.

In response to receiving the fixed-path notification signal from the parent station 11, the basic-information processing section 411 of the child station 13 instructs the path storage section to store therein the fixed-path contained in the fixed-path notification signal, and changes the path discrimination flag from "00" to "10" (S78). Then, the processing is completed.

Through the above operation, the child station 13 is given a fixed-path to the parent station 11, and automatically incorporated in the network 10.

A child station 13 can be directly connected to the parent station 11. In this case, the parent station 11 will perform the above operation of the relay station 12.

While the above child station 13 is configured to determine the identity of network ID, the relay station 12 may be configured to determine the identity of network ID when the relay station 12 returns a basic-information notification signal. This allows the processing at S73 and S81 in the child station 13 to be omitted so as to reduce a processing load in the child station 13.

Secondly, an operation in a case where a relay station 12 is added to the network will be described.

Figure 16:
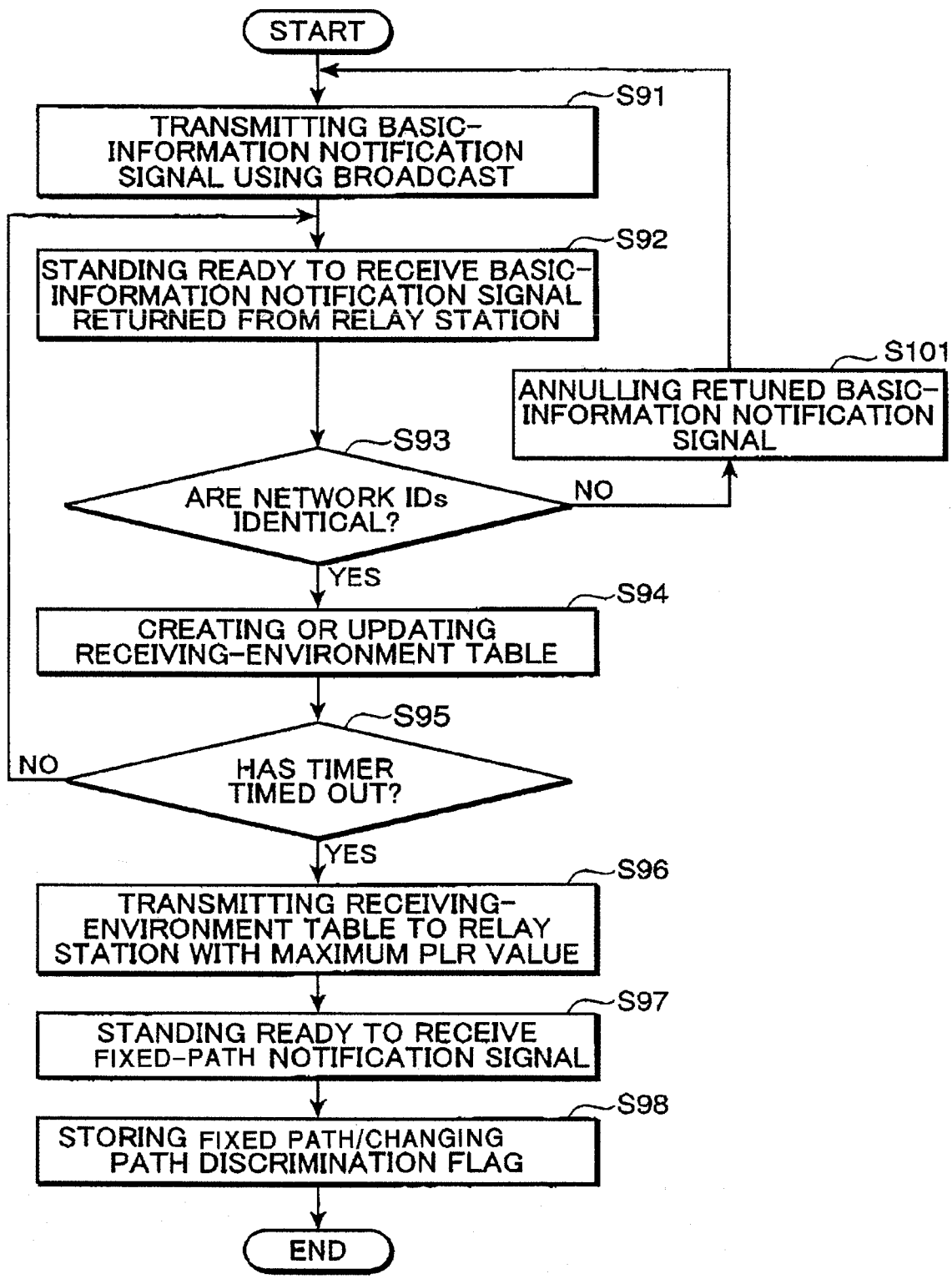
FIG. 16 is a flowchart showing an operation in cases where a relay station is added to the network.

FIG. 16 is a flowchart showing an operation in a case where a relay station 12 is added to the network. A user of a relay station 12 sets a network ID, and connects the relay station 12, for example, to a distribution line through a plug. For example, the network ID is notified from an administrator of the network 10 by mail, facsimile or telephone. Alternatively, the network administrator of the network 10 may set a network ID to the relay station 12, and then give it to the user. In FIG. 16, the basic-information processing section 211 of the relay station (additional relay station) 12 generates a basic-information notification signal in response to the connection to the network, and transmits it by means of a broadcast using a CSMA/CA protocol (S91). Then, the basic-information processing section 211 stands ready to receive a basic-information notification signal returned from the surrounding relay stations 12 (S92).

In response to receiving the basic-information notification signal from the additional relay station 12, either one of the parent station 11 and the surrounding relay stations 12 updates its own receiving-environment table in accordance with the received basic-information notification signal, and returns a basic-information notification signal containing its own basic information. Specifically, the parent station 11 will perform this operation if it receives the basic-information notification signal from the additional relay station 12, and the surrounding relay station 12 will perform this operation if it receives the basic-information notification signal from the additional relay station 12.

In response to receiving the returned basic-information notification signal, the receiving-environment processing section 213 of the additional relay station 12 determines whether the network ID contained in the returned basis-information notification signal is identical to the network ID stored in the ID storage section of the additional relay station 12 (S93).

As the result of the determination, when the respective network IDs are not identical to one another (NO), the receiving-environment processing section 213 of the additional relay station 12 annuls the received basic-information notification signal (S101), and returns the processing to S92. That is, the receiving-environment processing section 213 of the additional relay station 12 returns to the state of standing ready to receive a basic-information notification signal. As the result of the determination, when the respective network IDs are identical to one another (YES), the transmission-quality-evaluation processing section 212 of the additional relay station 12 acquires a receiving intensity of the received basic-information notification signal from the power-line communication modem 23 to calculate a transmission quality, and notifies the calculation result to the receiving-environment processing section 213. Then, the receiving-environment processing section 213 of the additional relay station 12 creates or updates a receiving-environment table in accordance with the basic information contained in the received basic-information notification signal and the transmission quality from the transmission-quality-evaluation processing section 213 (S94).

Then, the receiving-environment processing section 212 of the additional relay station 12 determines whether a timer has timed out (S95). For example, the timer is configured to be set at "0 (zero)" in conjunction with the activation of the additional relay station 12. As the result of the determination, when the timer has not timed out (NO), the receiving-environment processing section 213 of the additional relay station 12 returns the processing to S92. As the result of the determination, when the timer has timed out (YES), the receiving-environment processing section 213 of the additional relay station 12 compares between PLR values in the receiving-environment table to retrieve the parent or relay station 11, 12 having a maximum PLR value, and transmits a communication signal (receiving-environment/basic-information notification signal) containing the receiving-environment table and the basic information of the additional relay station 12 to the parent station 11 or the surrounding relay station 12, by means of a unicast (S96). Then, the additional relay station 12 stands ready to receive a fixed-path notification signal (S97). A setting method for a timeout period of a timer and a selection method in a case where a plurality of relay stations 12 have a maximum PLR value, are the same as those in the operation in the case of adding the child station 13.

In response to receiving the receiving-environment/basic-information notification signal returned from the additional relay station 12, the surrounding relay station 12 which has returned the basic-information notification signal forwards the receiving-environment/basic information notification signal received from the additional relay station 12, to the parent station 11. Then, based on the forwarded receiving-environment/basic-information notification signal of the additional relay station 12, the parent station 11 determines that the relay station 12 is added, and updates the transmission-quality table in accordance with the receiving-environment table in the receiving-environment/basic-information notification signal. Further, the parent station 11 re-calculates fixed-paths in accordance with an updated transmission-quality table according to the aforementioned algorithm, because the addition of the relay station 12 is the change in main lines. Then, the parent station 11 notifies the set fixed-paths to respective ones of the entire relay stations 12 including the additional relay station 12, by used of a fixed-path notification signal.

In this operation, instead of transmitting the fixed-path notification signal to all of the relay stations 12, the parent station 11 may be configured to transmit the fixed-path notification signal only to a part of the relay stations 12 each having a re-calculated fixed-path different from its fixed-path before the re-calculation. This can reduce communication traffic. The parent station 11 may also be configured to set a communication route used for transmitting/forwarding the receiving-environment/basic-information notification signal of the additional relay station 12, as a fixed-path from the additional relay station 12 to the parent station 11, and to re-calculate fixed-paths according to the aforementioned algorithm based on the updated transmission-quality table when the number of additional relay stations 12 is increased up to a given value or when a new relay station is further added to the additional relay station 12. This makes it possible to quickly set a fixed-path and reduce a calculation load in the parent station 11.

In response to receiving the fixed-path notification signal from the parent station 11, the basic-information processing section 211 of the additional relay station 12 instructs the path storage section to store therein the fixed-path contained in the fixed-path notification signal, and changes the path discrimination flag from "00" to "10" (S98). Then, the processing is completed. In the same way, in response to receiving the fixed-path notification signal from the parent station 11, each of the remaining relay stations 12 also updates the content of its path storage section in accordance with the fixed-path contained in the fixed-path notification signal.

Through the above operation, the additional relay station 12 is given a fixed-path to the parent station 11, and automatically incorporated in the network 10. Except for the fixed-path setting operation of the parent station 11 in response to receiving a receiving-environment-table communication signal, the respective operations for adding a child station 13 and a new relay station 12 are the same.

While the additional child station 13 or the additional relay station 12 in the above embodiment is configured to transmit the basic information together with the receiving-environment table which is transmitted to the parent station 11, an identifier indicative of a device type may be transmitted together with the receiving-environment table, in place of the basic information, so as to allow the parent station 11 to identify whether the additional station is a child station 13 or a relay station 12. For example, "RMT" and "RPT" are used as the identifiers indicative of the child station 13 and the relay station 12, respectively.

In order to allow a plurality of networks to commonly use the transmission line 14, the setting device in the above embodiment is configured such that it is connected to the ID storage section 222, 322, 422 through the external-device connection interface 24, 34, 44 to store a network ID in the ID storage section. However, in cases where the transmission line 14 is not commonly used by a plurality of networks, there is no need for the external-device connection interface 24, 34, 44 and the ID storage section 222, 322, 422, and the processing for annulling the received signal according to the determination whether the network IDs are identical to one another in FIGS. 7, 8, 15 and 16 can be omitted.

The above embodiment is described in connection with the example where the present invention is applied to the power-line communication using a distribution line as a transmission line, because the present invention is suitable for a network where the transmission quality of a transmission line is not defined. However, the present invention is not limited to such an embodiment, but it is to be understood that the present invention can be applied to a network where the transmission quality of a transmission line is defined.

While the present invention has been described adequately and sufficiently through the embodiment thereof with reference to the drawings in order to explain the principles of the present invention, it should be understood that various changes and/or modifications of the embodiment will become apparent to persons skilled in the art upon reference to the above description. Therefore, as long as changes and/or modifications made by persons skilled in the art are not at the level departing from the scope of the present invention as defined in the appended claims, it shall be construed that such changes and/or modifications may be included within the scope of the present invention.

The invention claimed is:

1. In a network including a plurality of relay stations and a parent station which are connected with each other through a transmission line, a path setting method for generating fixed paths from the parent station to respective ones of the relay stations, the path setting method enabling a parent station to set the fixed path to respective ones of the plurality of relay stations, the path setting method comprising:

allowing each of the parent station and the plurality of relay stations to transmit a basic-information notification signal to the network at a first time interval by a repetitive broadcast, the basic-information notification signal containing basic information which includes an identifier identifying its own station and the status of the path setting to its own station;

allowing, in response to receiving the basic-information notification signal, each of the parent station and the plurality of relay stations to detect a receiving state and calculate a transmission quality on a transmission line interconnecting with the station which has transmitted the basic-information notification signal, in accordance with the receiving state;

allowing each of the parent station and the plurality of relay stations to create or update a receiving-environment table correlating the basic information contained in the basic-information notification signal to the transmission quality on the transmission line interconnecting with the station which has transmitted the basic-information notification signal, and store the created or updated receiving-environment table therein;

allowing each of the plurality of relay stations to repeatedly refer to the path-setting status in the receiving-environment table at a second time interval greater than the first time interval, and, when the reference result shows that temporary-path setup information representing the completion of setting a temporary path exists in the path-setting status, transmit a receiving-environment-table communication signal containing the receiving-environment table of its own station through the transmission line used for transmitting the basic-information notification signal containing the temporary-path setup information;

allowing, in response to receiving the receiving-environment-table communication signal, each of the plurality of relay stations to forward the received receiving-environment-table communication signal to the parent station through the use of the temporary path;

allowing, in response to receiving the receiving-environment-table communication signal, the parent station to create or update a transmission-quality table correlating the inter-station transmission line to the transmission quality thereof, in accordance with the identifier and the transmission quality contained in the receiving-environment-table communication signal, and store the created or updated transmission-quality table in the parent station;

allowing, in response to receiving the receiving-environment-table communication signal, the parent station to set a temporary path to the relay station which has transmitted the receiving-environment-table communication signal, and return a temporary-path setup information containing the temporary path to the relay station; and allowing, in response to a lapse of a third time interval greater than the second time interval, the parent station to set the fixed paths to respective ones of the plurality of relay stations, in accordance with the transmission qualities in the transmission-quality table, and transmit the set fixed paths to respective ones of the plurality of relay stations.

2. The path setting method as defined in claim 1, further comprising:

allowing an additional relay station which is newly added to the network, to transmit the basic-information notification signal to the network by a broadcast;

allowing, in response to receiving the basic-information notification signal from the additional relay station, the existing relay station to return the basic-information notification signal containing the basic information of its own station to the additional relay station;

allowing, in response to receiving the basic-information notification signal returned from the existing relay station, the additional relay station to detect a receiving state and calculate a transmission quality on a transmission line interconnected with the existing relay station which has returned the basic-information notification signal, in accordance with the receiving state;

allowing the additional relay station to create or update a receiving-environment table correlating the basic information contained in the basic-information notification signal returned from the existing relay station to the transmission quality on the transmission line interconnecting with the existing relay station which has returned the basic-information notification signal, and store the created or updated receiving-environment table in the additional relay station;

allowing the additional relay station to refer to the transmission quality in the receiving-environment table, and transmit a receiving-environment-table communication signal containing the receiving-environment table of its own station to the parent station through the transmission line having the best transmission quality determined by the reference result;

allowing, in response to receiving the receiving-environment-table communication signal from the additional relay station, the parent station to update the transmission-quality table in accordance with the identifier and the path-setting status contained in the receiving-environment-table communication signal, and store the updated transmission-quality table in the parent station; and allowing the parent station to set the fixed paths to respective ones of the plurality of relay stations including the additional relay station, in accordance with the transmission qualities in the transmission-quality table, and transmit the set fixed paths to respective ones of the plurality of relay stations including the additional relay station.

3. The path setting method as defined in claim 1, further comprising:

allowing a child station which is newly added to the network, to transmit the basic-information notification signal to the network by broadcast;

allowing, in response to receiving the basic-information notification signal from the child station, the relay station to return the basic-information notification signal containing the basic information of its own station to the child station;

allowing, in response to receiving the basic-information notification signal returned from the relay station, the child station to detect a receiving state and calculate a transmission quality on a transmission line interconnecting with the relay station which has returned the basic-information notification signal, in accordance with the receiving state;

allowing the child station to create or update a receiving-environment table correlating the basic information contained in the basic-information notification signal returned from the relay station to the transmission quality on the transmission line interconnecting with the relay station which has returned the basic-information notification signal, and store the created or updated receiving-environment table in the child station;

allowing the child station to refer to the transmission quality in the receiving-environment table, and transmit a receiving-environment-table communication signal containing the receiving-environment table of its own station to the parent station through the transmission line having the best transmission quality determined by the reference result; and allowing, in response to receiving the receiving-environment-table communication signal from the child station, the parent station to set a fixed path to the child station in accordance with the path used for transmitting the receiving-environment-table communication signal, and transmit the set fixed path to the child station.

4. The path setting method as defined in claim 1, further comprising:

allowing each of the parent station and the plurality of relay stations when receiving a communication signal from another station, to detect a receiving state and calculate a transmission quality on a transmission line interconnecting with the another station, in accordance with the receiving state;

allowing the parent station to collect the transmission qualities from the plurality of relay stations;

allowing the parent station to re-set the fixed paths to respective ones of the plurality of relay stations, in accordance with the collected transmission qualities;

allowing the parent station to comparing the fixed paths to respective ones of the plurality of relay stations before the re-setting with the re-set fixed paths to respective ones of the plurality of relay stations; and allowing the parent station to present the comparison result on a display of the parent station.

5. The path setting method as defined in claim 1, wherein the transmission line is either a wireless line or a distribution line for supplying electric power.

6. The path setting method as defined in claim 1, wherein the transmission quality on the transmission line is a packet loss rate (PLR) value calculated from the receiving state of the transmission line, a packet length of the communication signal, and a communication rate of the transmission line.

7. A network including a plurality of relay stations and a parent station which are connected with each other through a transmission line, the network being configured to generate fixed paths from the parent station to respective ones of the relay stations, wherein each of the relay stations comprises:

a first communication section operable to transmit and receive a communication signal to/from the network, and detect a receiving state of the communication signal;

a first processing section operable to transmit a basic-information notification signal to the network using the first communication section at a first time interval by a repetitive broadcast, the basic-information notification signal containing basic information which includes an identifier identifying its own station and the status of the path setting to its own station;

a second processing section operable to calculate a transmission quality on a transmission line interconnecting with the station which has transmitted the basic-information notification signal, in accordance with the receiving state;

a third processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof;

a fourth processing section operable to repeatedly refer to the path-setting status in the receiving-environment table at a second time interval greater than the first time interval, and, when the reference result shows that temporary-path setup information representing the completion of setting a temporary path exists in the path-setting status, transmit a receiving-environment-table communication signal containing the receiving-environment table of its own station through the transmission line used for transmitting the basic-information notification signal containing the temporary-path setup information; and a fifth processing section operable, in response to receiving the receiving-environment-table communication signal, to forward the received receiving-environment-table communication signal to the parent station through use of the temporary path, and the parent station operable to set the fixed path to respective ones of the plurality of the relay stations, the parent station comprises:

a second communication section operable to transmit and receive a communication signal to/from the network, and detect a receiving state of the communication signal;

a sixth processing section operable to transmit a basic-information notification signal to the network using the second communication section at the first time interval by a repetitive broadcast, the basic-information notification signal containing basic information which includes an identifier identifying its own station and the status of the path setting to its own station;

a seventh processing section operable to calculate a transmission quality on a transmission line interconnecting with the station which has transmitted the basic-information notification signal, in accordance with the receiving state;

an eighth processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof;

a ninth processing section operable, in response to receiving the receiving-environment-table communication signal, to create or update a transmission-quality table correlating the inter-station transmission line to the transmission quality thereof, in accordance with the identifier and the transmission quality contained in the receiving-environment-table communication signal, and store the created or updated transmission-quality table in a transmission-quality-table storage section thereof;

a tenth processing section operable, in response to receiving the receiving-environment-table communication signal transmitted by the relay station, to set a temporary path to the relay station and to send to the relay station, using the second communication section, a temporary-path notification communication signal comprising the temporary path; and an eleventh processing section operable, in response to a lapse of a third time interval greater than the second time interval, to set the fixed paths to respective ones of the plurality of relay stations, in accordance with the transmission qualities in the transmission-quality table, and transmit the set fixed paths to respective ones of the plurality of relay stations using the second communication section.

8. A relay station applicable to a network including a plurality of relay stations and a parent station which are connected with each other through a transmission line, the network being configured to generate fixed paths from the parent station to respective ones of the relay stations, the fixed path being set by the parent station to the relay stations, the relay station comprising:
 a first communication section operable to transmit and receive a communication signal to/from the network, and detect a receiving state of the communication signal;
 a first processing section operable to transmit a basic-information notification signal to the network using the first communication section at a first time interval by a repetitive broadcast, the basic-information notification signal containing basic information which includes an identifier identifying its own station and the status of the path setting to its own station;
 a second processing section operable to calculate a transmission quality on a transmission line interconnecting with the station which has transmitted the basic-information notification signal, in accordance with the receiving state;
 a third processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof;
 a fourth processing section operable to repeatedly refer to the path-setting status in the receiving-environment table at a second time interval greater than the first time interval, and, when the reference result shows that temporary-path setup information representing the completion of setting a temporary path exists in the path-setting status, transmit a receiving-environment-table communication signal containing the receiving-environment table of its own station through the transmission line used for transmitting the basic-information notification signal containing the temporary-path setup information; and
 a fifth processing section operable, in response to receiving the receiving-environment-table communication signal, to forward the received receiving-environment-table communication signal to the parent station by use of the temporary path.

9. A parent station applicable to a network including a plurality of relay stations and a parent station which are connected with each other through a transmission line, the network being configured to generate fixed paths from the parent station to respective ones of the relay stations, the parent station being adapted to set the fixed-path to respective ones of the relay stations, the parent station comprising:
 a second communication section operable to transmit and receive a communication signal to/from the network, and detect a receiving state of the communication signal;
 a sixth processing section operable to transmit a basic-information notification signal to the network using the second communication section at the first time interval by a repetitive broadcast, the basic-information notification signal containing basic information which includes an identifier identifying its own station and the status of the path setting to its own station;
 a seventh processing section operable to calculate a transmission quality on a transmission line interconnecting with the station which has transmitted the basic-information notification signal, in accordance with the receiving state;
 an eighth processing section operable to create or update a receiving-environment table correlating the basic information contained in the basic-information notification signal to the transmission quality on the transmission line interconnecting with the station which has transmitted the basic-information notification signal, and store the created or updated receiving-environment table in a receiving-environment-table storage section thereof;
 a ninth processing section operable, in response to receiving a receiving-environment-table communication signal containing the receiving-environment table of the relay station, to create or update a transmission-quality table correlating the inter-station transmission line to the transmission quality thereof, in accordance with the identifier and the transmission quality contained in the receiving-environment-table communication signal, and store the created or updated transmission-quality table in a transmission-quality-table storage section thereof;
 a tenth processing section operable, in response to receiving the receiving-environment-table communication signal, to set a temporary path to the relay station which has transmitted the receiving-environment-table communication signal, and return a temporary-path notification communication signal containing the temporary path to the relay station using the second communication section; and
 an eleventh processing section operable, in response to a lapse of a third time interval greater than the second time interval, to set the fixed paths to respective ones of the plurality of relay stations, in accordance with the transmission qualities in the transmission-quality table, and transmit the set fixed paths to respective ones of the plurality of relay stations using the second communication section.

* * * * *